(12) United States Patent
Syrichas et al.

(10) Patent No.: US 9,841,990 B2
(45) Date of Patent: Dec. 12, 2017

(54) ENCODING OF A SCHEDULE INTO A BINARY STRUCTURE

(71) Applicant: Service Power Technologies PLC, Stockport (GB)

(72) Inventors: Alex Syrichas, Stockport (GB); Alan Crispin, Leeds (GB)

(73) Assignee: ServicePower, Inc., McLean, VA (US)

(*) Notice: Subject to any disclaimer, the term of this patent is extended or adjusted under 35 U.S.C. 154(b) by 107 days.

(21) Appl. No.: 15/066,104

(22) Filed: Mar. 10, 2016

(65) Prior Publication Data

US 2017/0060623 A1    Mar. 2, 2017

(51) Int. Cl.
G06F 9/46         (2006.01)
G06N 7/00         (2006.01)
G06N 99/00        (2010.01)

(52) U.S. Cl.
CPC ............. G06F 9/466 (2013.01); G06N 7/005 (2013.01); G06N 99/002 (2013.01)

(58) Field of Classification Search
None
See application file for complete search history.

(56) References Cited

U.S. PATENT DOCUMENTS

| | | |
|---|---|---|
| 5,467,268 A | 11/1995 | Sisley et al. |
| 5,623,404 A | 4/1997 | Collins et al. |
| 5,737,728 A | 4/1998 | Sisley et al. |
| 5,943,652 A | 8/1999 | Sisley et al. |
| 6,985,872 B2 | 1/2006 | Benbassat et al. |
| 7,054,822 B2 | 5/2006 | McCall |
| 7,155,519 B2 | 12/2006 | Lo et al. |
| 7,269,569 B2 | 9/2007 | Spira et al. |
| 7,346,531 B2 | 3/2008 | Jacobs |

(Continued)

FOREIGN PATENT DOCUMENTS

| | | |
|---|---|---|
| CA | 2141171 A1 | 8/1995 |
| CA | 2142501 A1 | 9/1995 |

(Continued)

OTHER PUBLICATIONS

Crispin et al. "Quantum annealing algorithm for vehicle scheduling, Oct. 13-16, 2013, IEEE".*

(Continued)

*Primary Examiner* — Sisley Kim
(74) *Attorney, Agent, or Firm* — LeClairRyan, a Professional Corporation

(57) ABSTRACT

A method determines a schedule indicator value for each of a plurality of schedule data entries based on whether each of a set of recorded tasks has been allocated to one or more identifier data names in one or more of a set of time periods in accordance with the first schedule data to generate schedule portion data. A hard constraint indicator value is determined for each of a plurality of hard constraint data entries based on whether at least one hard constraint has been violated by the allocation of the set of recorded tasks to one or more of the identifier data names in one or more of the time periods in accordance with the schedule data to generate hard constraint portion data. The data structure is generated based on the determined schedule portion and hard constraint portion data encoding the schedule data into a data structure.

30 Claims, 9 Drawing Sheets

(56) References Cited

U.S. PATENT DOCUMENTS

| | | |
|---|---|---|
| 7,406,431 B2 | 7/2008 | Spira et al. |
| 7,406,475 B2 | 7/2008 | Dorne et al. |
| 7,487,105 B2 | 2/2009 | Jacobs |
| 7,565,338 B2 | 7/2009 | Beniaminy et al. |
| 7,587,327 B2 | 9/2009 | Jacobs et al. |
| 7,603,285 B2 | 10/2009 | Jacobs et al. |
| 7,693,735 B2 | 4/2010 | Carmi et al. |
| 7,986,246 B2 | 7/2011 | Angelis et al. |
| 7,996,284 B2 | 8/2011 | Bar et al. |
| 8,019,622 B2 | 9/2011 | Kaboff et al. |
| 8,185,346 B2 | 5/2012 | Sjostrand et al. |
| 8,346,588 B2 | 1/2013 | Baumer et al. |
| 8,380,542 B2 | 2/2013 | Wons et al. |
| 8,700,656 B2 | 4/2014 | Gutlapalli et al. |
| 8,768,738 B2 | 7/2014 | Jacobs |
| 8,781,873 B2 | 7/2014 | Purohit et al. |
| 2001/0037229 A1 | 11/2001 | Jacobs et al. |
| 2001/0047287 A1 | 11/2001 | Jacobs et al. |
| 2001/0047288 A1 | 11/2001 | Jacobs et al. |
| 2002/0010610 A1 | 1/2002 | Jacobs et al. |
| 2002/0010615 A1 | 1/2002 | Jacobs et al. |
| 2002/0016645 A1 | 2/2002 | Jacobs et al. |
| 2002/0023157 A1 | 2/2002 | Lo et al. |
| 2002/0035495 A1 | 3/2002 | Spira et al. |
| 2002/0156666 A1 | 10/2002 | Taylor et al. |
| 2002/0161600 A1 | 10/2002 | Stubiger et al. |
| 2002/0161614 A1 | 10/2002 | Spira et al. |
| 2003/0033396 A1 | 2/2003 | McCall |
| 2003/0172002 A1 | 9/2003 | Spira et al. |
| 2003/0220827 A1 | 11/2003 | Murphy |
| 2004/0044554 A1 | 3/2004 | Bull et al. |
| 2004/0049479 A1 | 3/2004 | Dorne et al. |
| 2006/0111957 A1 | 5/2006 | Carmi et al. |
| 2006/0143044 A1 | 6/2006 | Conry et al. |
| 2006/0143060 A1 | 6/2006 | Conry et al. |
| 2007/0016496 A1 | 1/2007 | Bar et al. |
| 2007/0043634 A1 | 2/2007 | Bar et al. |
| 2007/0152049 A1 | 7/2007 | Bar et al. |
| 2007/0174390 A1 | 7/2007 | Silvain et al. |
| 2007/0208604 A1 | 9/2007 | Purohit et al. |
| 2007/0247331 A1 | 10/2007 | Angelis et al. |
| 2008/0228314 A1 | 9/2008 | Sjostrand et al. |
| 2008/0288539 A1 | 11/2008 | Jacobs et al. |
| 2009/0048853 A1 | 2/2009 | Hall |
| 2009/0204461 A1 | 8/2009 | Jain et al. |
| 2009/0319572 A1 | 12/2009 | Bernard |
| 2010/0198608 A1 | 8/2010 | Kaboff et al. |
| 2010/0257015 A1 | 10/2010 | Molander |
| 2011/0010087 A1 | 1/2011 | Wons et al. |
| 2011/0231462 A1* | 9/2011 | Macready ............. B82Y 10/00 708/231 |
| 2011/0307272 A1 | 12/2011 | Kaboff et al. |
| 2012/0041788 A1 | 2/2012 | Wons et al. |
| 2012/0166243 A1 | 6/2012 | Belmont et al. |
| 2012/0303647 A1 | 11/2012 | Gutlapalli et al. |
| 2012/0303817 A1 | 11/2012 | Gutlapalli et al. |
| 2013/0191162 A1 | 7/2013 | Wons et al. |
| 2013/0332180 A1 | 12/2013 | George et al. |
| 2013/0332185 A1 | 12/2013 | George et al. |
| 2013/0332214 A1 | 12/2013 | George et al. |
| 2013/0332216 A1 | 12/2013 | George et al. |
| 2014/0278652 A1 | 9/2014 | Joyner et al. |
| 2015/0193692 A1 | 7/2015 | Israel |
| 2015/0205759 A1* | 7/2015 | Israel ................. G06N 99/002 703/2 |
| 2015/0269124 A1* | 9/2015 | Hamze ................. G06F 17/18 703/2 |
| 2016/0321559 A1* | 11/2016 | Rose ................. G06N 99/002 |

FOREIGN PATENT DOCUMENTS

| | | |
|---|---|---|
| CA | 2373470 A1 | 9/2001 |
| CA | 2374578 A1 | 9/2001 |
| CA | 2384887 A1 | 9/2001 |
| CA | 2390694 A1 | 9/2001 |
| CA | 2433996 A1 | 7/2002 |
| CA | 2578286 A1 | 4/2003 |
| CA | 2583057 A1 | 3/2007 |
| CA | 2579081 A1 | 4/2008 |
| CA | 2757324 A1 | 10/2010 |
| CN | 101256404 A | 9/2008 |
| DE | 69518559 T2 | 4/2001 |
| DE | 102005005413 A1 | 8/2006 |
| DE | 102005005413 B4 | 12/2006 |
| EP | 0669586 A2 | 8/1995 |
| EP | 0669586 A3 | 8/1995 |
| EP | 0672990 A2 | 9/1995 |
| EP | 0672990 A3 | 9/1995 |
| EP | 0797164 B1 | 9/1997 |
| EP | 1204941 A1 | 5/2002 |
| EP | 1218845 A1 | 7/2002 |
| EP | 1221667 A1 | 7/2002 |
| EP | 1208417 A2 | 3/2003 |
| EP | 1554691 A1 | 7/2005 |
| EP | 1956281 A1 | 8/2008 |
| MX | 01011785 A | 5/2002 |
| MX | 01011786 A | 5/2002 |
| MX | 01011787 A | 5/2002 |
| MX | 01011784 A | 6/2002 |
| WO | WO 2010114992 A1 | 8/1995 |
| WO | WO 0169417 A2 | 9/2001 |
| WO | WO 0171454 A2 | 9/2001 |
| WO | WO 0171454 A3 | 9/2001 |
| WO | WO 0171607 A1 | 9/2001 |
| WO | WO 0171613 A1 | 9/2001 |
| WO | WO 0175637 A2 | 10/2001 |
| WO | WO 0175663 A2 | 10/2001 |
| WO | WO 0175691 A2 | 10/2001 |
| WO | WO 0175692 A2 | 10/2001 |
| WO | WO 0175693 A2 | 10/2001 |
| WO | WO 0175694 A2 | 10/2001 |
| WO | WO 0177912 A2 | 10/2001 |
| WO | WO 02056249 A2 | 7/2002 |
| WO | WO 02056249 A3 | 7/2002 |
| WO | WO 03014875 A2 | 2/2003 |
| WO | WO 03014875 A3 | 2/2003 |
| WO | WO 2006081816 A1 | 8/2006 |
| WO | WO 2007084735 A2 | 7/2007 |
| WO | WO 2008028290 A1 | 3/2008 |
| WO | WO 2012054925 A2 | 4/2012 |
| WO | WO 2014145652 A1 | 9/2014 |

OTHER PUBLICATIONS

Crispin et al., "Quantum Annealing Algorithm for Vehicle Scheduling", 2013 IEEE Conference on Systems, Man, and Cybernetics, pp. 3523-3528 (2013).
Ruiz, "Quantum Annealing", 2011.
Croft, "ServicePower Scheduling Parameters", Nov. 30, 2016, pp. 1-6, Version 1.1, SBS Ltd.
Croft, "Why is Intelligent Scheduling the Most Efficient Approach for {Customer}", Mar. 7, 2001, pp. 1-6, Version 1.1, SBS Ltd.
Croft, Why is Optimization So Important for Same Day Scheduling, and Future Day Scheduling?, Feb. 21, 2002, pp. 1-3, Version 1.0.
Croft, "Scheduling and Optimization—Requirements and Solutions", Jun. 17, 2004, pp. 1-10, Version 2.0, SBS Ltd.
Doherty, "Worldwide Scan Search Report", dated Mar. 6, 2015, pp. 1-14, pp. 1-14.
Extended European Search Report for Application No. 16/180,204.6, dated Jul. 11, 2016, pp. 1-9.
Extended European Search Report for Application No. 16/180,217.8, dated Nov. 23, 2016, pp. 1-6.

* cited by examiner

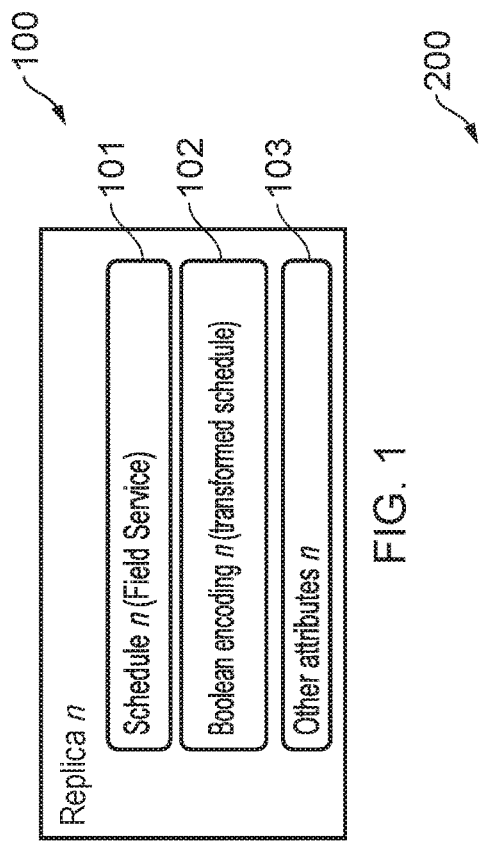

FIG. 3 — 300

| Service Technicians | Skills | Location |
|---|---|---|
| $O_0$ | A | $L_A$ |
| $O_1$ | ABC | $L_B$ |
| $O_2$ | CD | $L_C$ |
| $O_3$ | ABCD | $L_D$ |

FIG. 4 — 400

| Hard constraint | Description |
|---|---|
| $h_0$ | Start on time |
| $h_1$ | Correct skills |

410

| Soft constraint | Description |
|---|---|
| $s_0$ | Overtime |
| $s_1$ | Location |

FIG. 5 — 500

| Job | Start period | Duration | Required Skills | Location |
|---|---|---|---|---|
| $j_0$ | 0 | 2 | A | $L_A$ |
| $j_1$ | 1 | 1 | AB | $L_A$ |
| $j_2$ | 1 | 3 | B | $L_D$ |
| $j_3$ | 2 | 2 | C | $L_C$ |

FIG. 6 — 200

| | $t_0$ | $t_1$ | $t_2$ | $t_3$ | $t_0$ | $t_1$ | $t_2$ | $t_3$ | $h_0$ | $h_1$ | $s_0$ | $s_1$ | $t_0$ | $t_1$ | $t_2$ | $t_3$ | $j_0$ | $j_1$ | $j_2$ | $j_3$ | Hexadecimal (64 bits) |
|---|---|---|---|---|---|---|---|---|---|---|---|---|---|---|---|---|---|---|---|---|---|
| $O_0$ | 1 | 1 | 0 | 0 | 0 | 0 | 1 | 1 | 0 | 1 | 1 | 1 | 1 | 1 | 1 | 1 | 1 | 0 | 0 | 0 | 000000000000CFF8 |
| $O_1$ | 0 | 1 | 1 | 0 | 0 | 0 | 1 | 1 | 1 | 1 | 1 | 1 | 1 | 1 | 1 | 1 | 0 | 1 | 0 | 0 | 0000000000004EF4 |
| $O_2$ | 0 | 0 | 1 | 1 | 1 | 1 | 1 | 1 | 0 | 1 | 1 | 1 | 1 | 1 | 1 | 1 | 0 | 0 | 0 | 1 | 0000000000003FF1 |
| $O_3$ | 0 | 1 | 1 | 1 | 1 | 1 | 1 | 1 | 1 | 1 | 1 | 0 | 1 | 1 | 1 | 0 | 0 | 0 | 1 | 0 | 0000000000007EF2 |

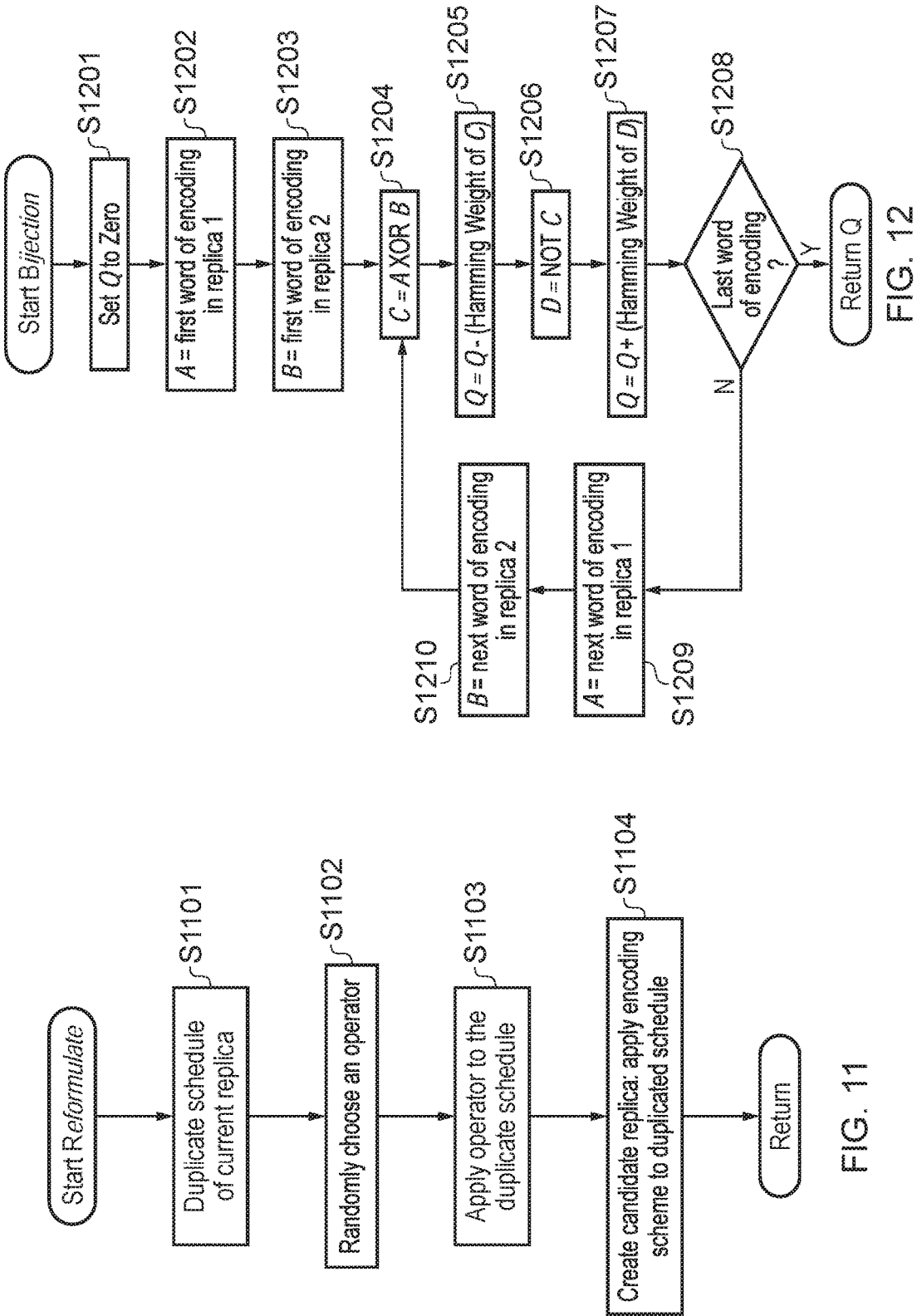

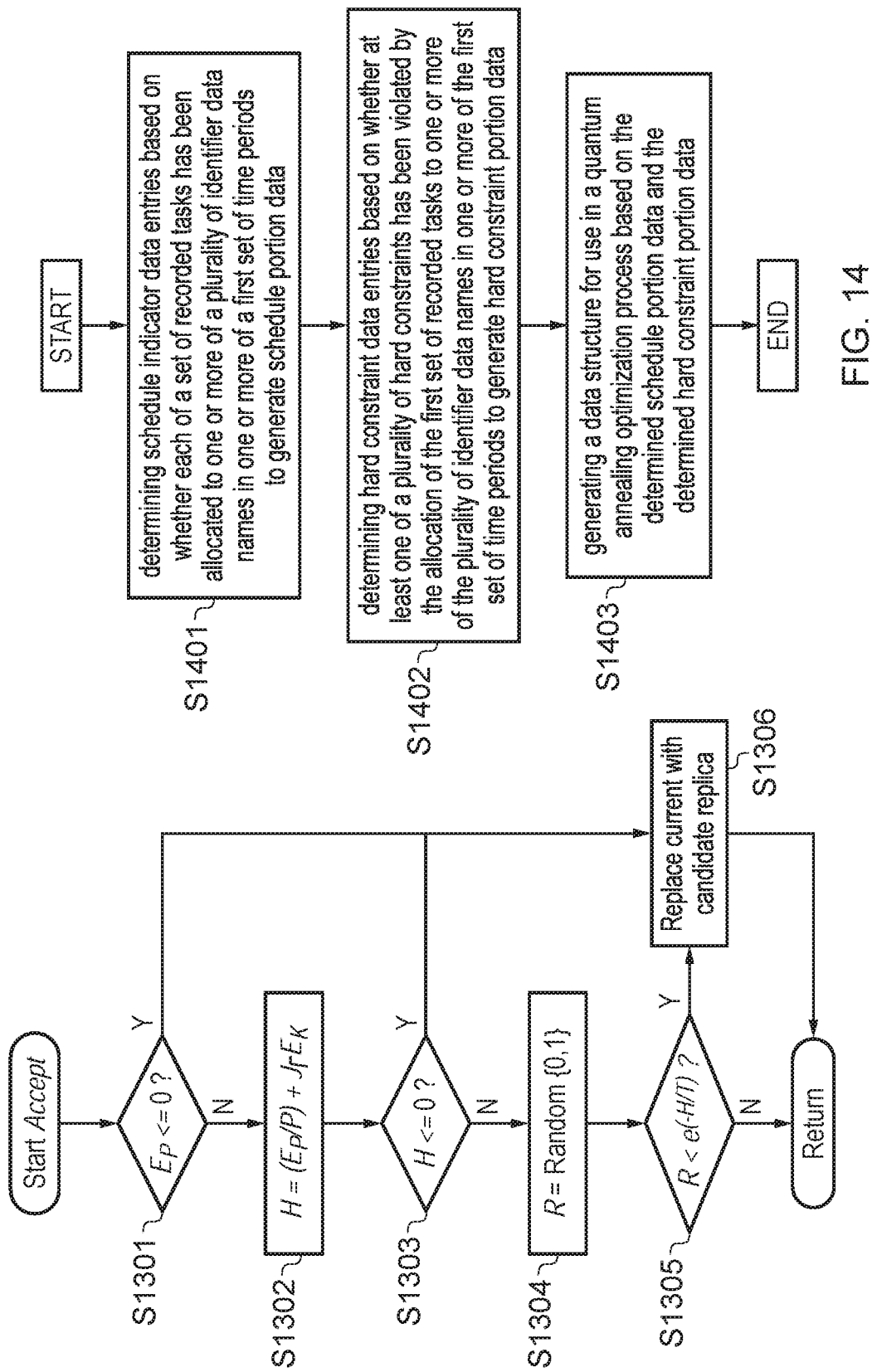

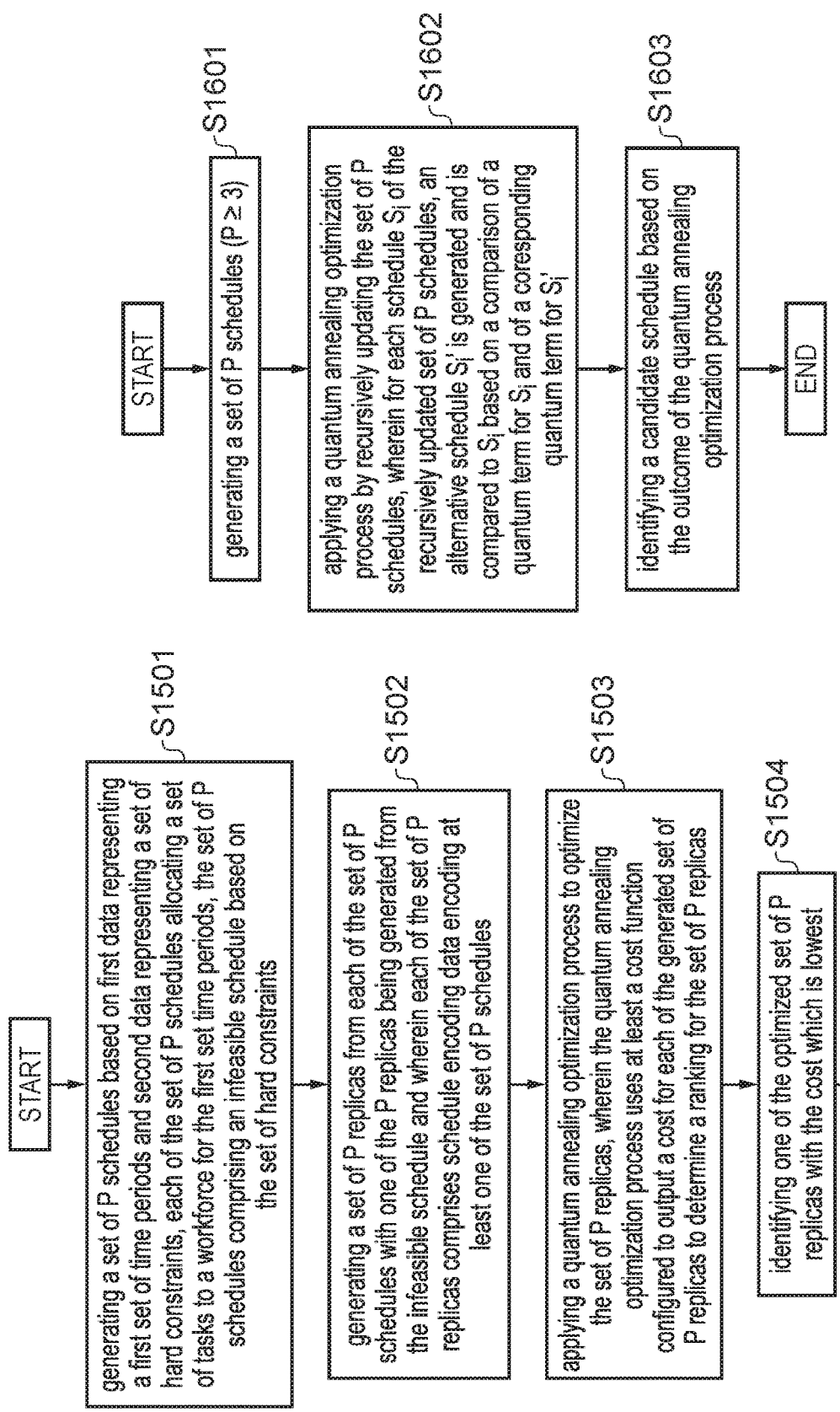

ENCODING OF A SCHEDULE INTO A BINARY STRUCTURE

This application claims the benefit of Great Britain Patent Application Serial No. 1515317.4 filed Aug. 28, 2015 which is hereby incorporated by reference in its entirety.

FIELD

The present invention relates to a method, apparatus and system for encoding of a schedule into a structure for use in a Quantum Annealing (QA) optimization process. This is particularly useful for, but not limited to, the Field Services Scheduling (FSS) industry where complex schedules have to be optimized.

BACKGROUND

When contemplating the problem of optimizing a schedule (i.e. of identifying a schedule that is considered as satisfactory and/or as more satisfactory than a starting schedule), several complex and interacting aspects have to be considered. A schedule can generally be defined as a set of associations between tasks or jobs and workers, persons, groups of persons/workers or anyone/anything able to carry a task. There can be hard constraints associated with the situation, for example, a worker may not have more than n tasks associated to it, a worker can only be associated a task if they have the minimum required skills for carrying out the task, etc. Such hard constraints define what a feasible schedule is and what an unfeasible schedule is amongst the universe of possible (feasible and infeasible) schedules: a schedule that violates at least one hard constraint will be considered an infeasible schedule while all other schedules will be considered feasible schedules. As the skilled person knows, for a schedule to be a suitable schedule, the schedule must be a feasible schedule such that the search for a suitable schedule should search a suitable schedule amongst the feasible schedules and should not select an infeasible schedule. At the same time, the suitable schedule should attempt to optimize some aspects as much as possible. Examples of aspects that the schedule may attempt to optimize may include for example any of: a number of soft constraints violated (to be reduced), a number of consecutive tasks allocated during a worker's shift (to be increased so as to reduce the number empty slots), an amount of overtime (to be reduced), a travel distance (to be reduced), etc. These aspects to optimize can be taken into account in one or more cost functions which should be minimised (or maximised) for the best schedules. The problem of finding a suitable schedule for a set of tasks and workers can therefore involve trying to identify a suitable feasible solution among the vast number of possible solutions for allocating the tasks to the workers, while trying optimize one or costs functions.

Another point which affects the complexity of identifying a suitable schedule is that neighboring or similar schedules (schedules which are very close to each other in the allocation of tasks) may result in very different outcomes regarding costs and/or constraint violations. For example, while one schedule may not violate any hard constraint and have a relatively low cost compared to other schedules, making one minor change to this one schedule may then result in a new schedule with one or more hard constraint being violated and/or a cost suddenly increasing to an unacceptable value. As a result of this chaotic behavior, conventional approaches for finding optimized solutions for simple problems (e.g. using dichotomy or searching for neighbors of relatively good solutions already identified) are not expected to be successful or helpful as they are expected to be more likely to miss potentially good schedules, for example schedules which may be remote for the schedules considered by the search.

Problems of this kind are classified in the domain of computation complexity theory as NP-complete and NP-hard, meaning that as the problem grows in size, the time taken to deterministically find ideal solutions increases exponentially. Consequently, for any real-life situation with different workers, tasks, hard and soft constraints and aspects to optimize, the computing resources and time required to find the best overall schedule are far too vast to make a search of the best schedule possible or realistic. Thus, heuristic approaches are used to find useable, rather than ideal, feasible solutions within an acceptable amount of time. Such approaches stop when a good enough solution has been identified or when the search has been running for a certain amount of time and the best solution amongst the solutions searched can be identified as the best solution that could be found. These approaches are generally designed to work for a specific problem and can be difficult to adapt for a different problem. In particular, in view of the "no free lunch theorem", while a first search method may be optimized to address a specific set of problems and be expected to yield good results in a reasonable time with this set of problems, this first method may then be expected to be sub-optimal for another set of problems and a different searching method would have to be devised to optimize the identification of suitable feasible solutions to the other set of problems in a reasonable time. In view of the complexity and the nature of the search, even with the vast computing capabilities now available in computers and computer systems, an exhaustive search is clearly out of reach and while a computer implementation for such a search is considered as being essential for attempting to identify a suitable feasible solution in a reasonable amount of time, it is considered desirable to identify any means by which the computer implementation of such a search can be accelerated and/or simplified.

In other words, due to the difficulties that are faced when trying to improve a search for a suitable schedule, any improvements in the efficiency of the identification of suitable feasible schedules are generally challenging to identify. Also, in view of the complexity of such systems and of the exponential increase for any additional factor added, any such improvements can translate in very significant improvements in the time needed to find a suitable feasible solution and/or in the computing resources required for identifying a suitable solution.

SUMMARY

The invention is defined by the appended claims.

According to a first example of the present disclosure, there is provided a method for encoding first schedule data into a data structure for use in a quantum annealing optimization process. The method comprises determining, by a process optimization computing device, a schedule indicator value for each of a plurality of schedule data entries based on whether each of a first set of recorded tasks has been allocated to one or more of a plurality of identifier data names in one or more of a first set of time periods in accordance with the first schedule data to generate schedule portion data; determining, by the process optimization computing device, a hard constraint indicator value for each of a plurality of hard constraint data entries based on whether at least one of a plurality of hard constraints has been violated by the allocation of the first set of recorded tasks to one or more of the plurality of identifier data names in one or more of the first set of time periods in accordance with the first schedule data to generate hard constraint portion data; and generating, by the process optimization computing device, the data structure for use in a quantum annealing optimization process based on the determined schedule portion data and the determined hard constraint portion data, thereby encoding the first schedule data into a data structure for use in a quantum annealing optimization process.

Accordingly, there is provided a method for generating a data structure and data which is suitable for use in a quantum annealing optimization process and for encoding a schedule represented by schedule data. The schedule can thus be encoded in a data form which can be manipulated by a quantum annealing optimizer, e.g. a computer implemented quantum annealing optimizer.

The data structure may be a binary data structure, wherein the schedule indicator data entries are binary schedule indicator data entries and wherein the hard constraint data entries are binary hard constraint data entries. As will be clear from the discussion below, in addition to provide a method for encoding a schedule into a data structure such that it can be optimized, by encoding the schedule into a binary data structure, the schedule can be encoded to facilitate a quicker optimization implementation.

The hard constraint data entries may indicate, for each identifier data name of the plurality of identifier data names and for each hard constraint of the plurality of hard constraints, whether each of the plurality of hard constraints has been violated by the task allocations for each of the plurality of identifier data names in accordance with the first schedule data.

The method may comprise determining, by the process optimization computing device, a task assignment indicator value for each of a plurality of task assignment data entries based on whether each of the first set of recorded tasks has been allocated to one of the plurality of identifier data names in accordance with the first schedule data to generate task assignment portion data, wherein the generating the data structure is further based on the task assignment portion data.

The method may comprise determining, by the process optimization computing device, a conflict indicator value for each of a plurality of conflict data entries based on whether each the plurality of identifier data names has been allocated two or more of the first set of recorded tasks in one or more of the first set of time periods in accordance with the first schedule data to generate conflict portion data, wherein the generating the data structure is further based on the conflict portion data.

The method may comprise receiving, by the process optimization computing device, a set of soft constraints defining one or more soft constraints in the allocation of tasks; and determining, by the process optimization computing device, a soft constraint indicator value for each of a plurality of soft constraint data entries based on whether each of the plurality of soft constraints has been violated by the allocation of the first set of recorded tasks to one or more of the plurality of identifier data names in one or more of the first set of time periods in accordance with the first schedule data to generate soft constraint portion data, wherein the generating the data structure is further based on soft constraint portion data.

The method may further comprise determining, by the process optimization computing device, a condition indicator value for each of a plurality of condition portion data entries based on whether each of a plurality of conditions is met for each of the plurality of identifier data names in accordance with the first schedule data, wherein the plurality of conditions are used to determine the output of a cost function for the first schedule data for use in the quantum annealing optimization process, and wherein the generating the data structure is further based on the condition portion data.

The method may further comprise outputting, by the process optimization computing device, the data structure for the first schedule data to a quantum annealing optimizer.

The method may further comprise applying, by the process optimization computing device, a quantum annealing optimization process using the data structure for the first schedule data for identifying a candidate schedule for allocating the first set of recorded tasks to the plurality of identifier data names for the first set of time periods, wherein the candidate schedule meets each of the plurality of hard constraints.

The data structure may be generated as one of a table or an array.

According to another example of the present disclosure, there is provided a non-transitory computer readable medium having stored thereon instructions for encoding first schedule data into a data structure for use in a quantum annealing optimization process. The non-transitory computer readable medium comprises machine executable code which when executed by a processor, causes the processor to perform steps to and that comprise determine a schedule indicator value for each of a plurality of schedule data entries based on whether each of a first set of recorded tasks has been allocated to one or more of a plurality of identifier data names in one or more of a first set of time periods in accordance with the first schedule data to generate schedule portion data; determine a hard constraint indicator value for each of a plurality of hard constraint data entries based on whether at least one of a plurality of hard constraints has been violated by the allocation of the first set of recorded tasks to one or more of the plurality of identifier data names in one or more of the first set of time periods in accordance with the first schedule data to generate hard constraint portion data; and generate the data structure for use in a quantum annealing optimization process based on the determined schedule portion data and the determined hard constraint portion data, thereby encoding the first schedule data into a data structure for use in a quantum annealing optimization process.

According to another example of the present disclosure, there is provided a non-transitory computer readable medium having stored thereon instructions for encoding first schedule data into a data structure for use in a quantum annealing optimization process comprising machine executable code which when executed by a processor, causes the processor to perform steps according to any of the example methods discussed above.

According to a further example of the present disclosure, there is provided a process optimization computing device, comprising one or more processors and a memory coupled to the one or more processors which are configured to be capable of executing programmed instructions stored in the memory to and that comprise determine a schedule indicator value for each of a plurality of schedule data entries based on whether each of a first set of recorded tasks has been allocated to one or more of a plurality of identifier data names in one or more of a first set of time periods in accordance with the first schedule data to generate schedule portion data; determine a hard constraint indicator value for each of a plurality of hard constraint data entries based on whether at least one of a plurality of hard constraints has been violated by the allocation of the first set of recorded tasks to one or more of the plurality of identifier data names in one or more of the first set of time periods in accordance with the first schedule data to generate hard constraint portion data; and generate the data structure for use in a quantum annealing optimization process based on the determined schedule portion data and the determined hard constraint portion data, thereby encoding the first schedule data into a data structure for use in a quantum annealing optimization process.

According to yet another example of the present disclosure there is provided a process optimization computing device, comprising one or more processors; and a memory coupled to the one or more processors which are configured to be capable of executing programmed instructions stored in the memory and which are for performing any of the example methods discussed above.

BRIEF DESCRIPTION OF THE DRAWINGS

Examples of the disclosure will now be described with reference to the accompanying drawings, throughout which like parts may be referred to by like references, and in which:

FIG. 1 is a simplified class diagram illustrating the structure of a replica in accordance with an example of the present disclosure;

FIG. 2 illustrates an encoded schedule in accordance with an example of the present disclosure;

FIGS. 3-6 illustrate example of technicians, constraints, tasks and of a possible corresponding encoded schedule in accordance with an example of the present disclosure;

FIG. 11 is a flowchart illustrating an example method for generating (reformulating) a new schedule from an existing schedule;

FIG. 12 is a flowchart illustrating an example method for the interact step of a quantum optimizer in accordance with an example of the present disclosure;

FIG. 13 is a flowchart illustrating an example method for determining the acceptance of a candidate replica in accordance with an example of the present disclosure FIG. 14 is an illustration of an example method of encoding a schedule into a structure for use in a quantum annealing optimization process in accordance with an example of the present disclosure;

FIG. 15 is an illustration of an example method of applying a quantum annealing optimization process for identifying a candidate schedule in accordance with an example of the present disclosure;

FIG. 16 is an illustration of an example method of applying a quantum annealing optimization process for identifying a candidate schedule;

DETAILED DESCRIPTION

Figure 7:
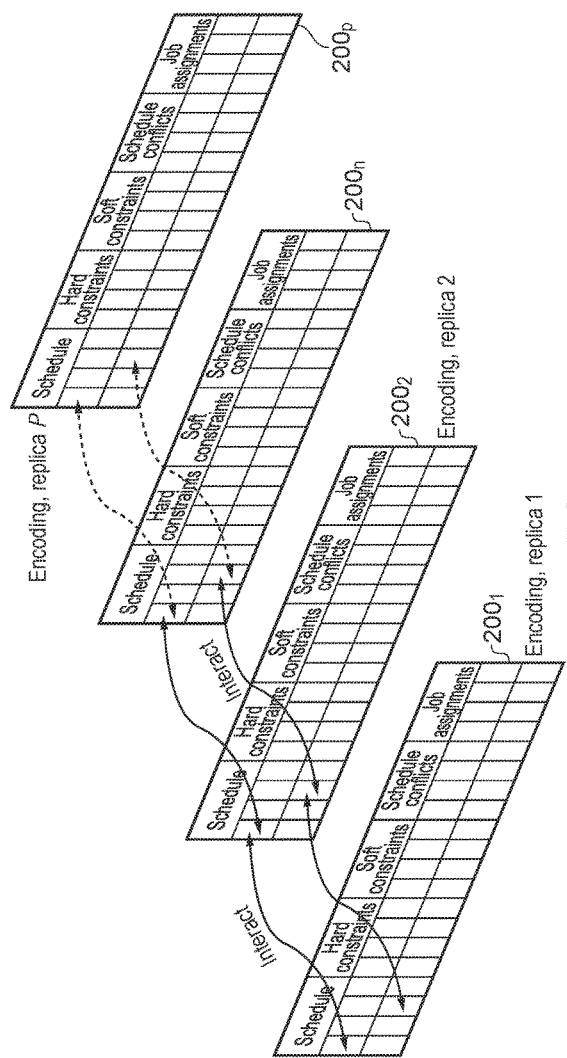
FIG. 7 illustrates a conceptual view of the Ising Model for field service scheduling in accordance with an example of the present disclosure.

Various embodiments are described more fully below with reference to the accompanying drawings, which form a part hereof, and which show specific examples and example embodiments. However, embodiments may be implemented in many different forms and should not be construed as limited to the examples as described herein.

Generally, the present disclosure is directed to using a metaheuristic optimization, for example using computer program, which simulates a quantum tunnelling effect to optimize a schedule such as a schedule used within the FSS industry. More specifically, the present disclosure discussed several aspects and possible implementations which improve the speed and computing efficiency of the search for a suitable schedule.

Conventionally, existing metaheuristic optimization methods involve searching for feasible schedules which minimise a cost function for schedules and an example existing metaheuristic optimization method is a Simulated Annealing (SA) algorithm. In terms of background, a cost function may be affected by several aspects and can be defined on a case by case basis depending for example on the type of schedules considered and on the actual use of the schedules. For example, it can take into account: a technician salary (one technician might be paid less than another and that could lower the cost value if assigned a particular job); a travel time (short distances would generally lower the cost value for example both in terms of providing a reduced operational running cost and in terms of increasing the time available for carrying out tasks and thus the overall efficiency); job priority (if higher priority jobs are serviced first, the cost value may be lower); overtime (if the amount of overtime is reduced, the cost would be expected to decrease as well). These cost aspects could also have a 'weighting' term applied to them. The weighting may be determined as deemed appropriate, for example salary may be more important to schedules with a smaller workforce so the weighting may then be higher. In contrast larger business with a larger workforce may be able to benefit from economies of scale, and a lower weight may then be used. Returning to the SA algorithm, while the SA optimization process can yield reasonably good results, it is expected that in the FSS industry, its results can be yet further improved. On the other hand, the Quantum Annealing (QA) algorithm is a new metaheuristic optimization algorithm that has recently been identified and which has, at this stage, mainly been discussed in a theoretical context. An example of such an academic paper is "Quantum annealing algorithm for vehicle scheduling" [1] which considers the application of a QA optimization to a simplified VRP problem. The use of QA optimization is expected to yield good results in the scheduling, and in particular the FSS, field for example because the QA optimization is expected to be more efficient in a context where the cost function can present high peaks between local minima or high "walls" around a local minimum solution—which are harder for an SA optimizer to avoid as the temperature parameter goes down—due to the "tunnelling effect" which makes a QA optimizer more likely to travel across a high wall or a high peak to reach neighbouring solutions. In other words, in an environment where the cost function can present abrupt changes, an SA optimizer is more likely to get stuck around a local minimum after some time while a QA optimizer is expected to still be able to consider and assess schedules further away from the local minimum. It is therefore expected that QA optimizers will perform better than SA optimizers for identifying schedules, for example in the FSS industry. However, this type of optimizer requires a large number of calculations based on a large amount of data such that the time and computing resources involved are important and any effort to reduce the calculation time and/or complexity can be beneficial and can have a considerable knock-on effect on the overall running time and/or efficiency of the optimizer. As the skilled person will understand, any simplification of a QA optimizer can translate in one of or any combination of (i) a reduction in running time, (ii) a reduction in the computing resources required and (iii) an efficiency of the optimizer. For example, by optimizing the identification of a schedule with a QA optimizer, the QA optimizer can run with the same configuration and computing resources, e.g. hardware, in a shorter amount of time (item (i)); or it can run with the same configuration and in the same amount of time but using less computing resources (item (ii)) which can free up resources; or it can run with a more complex configuration, e.g. using more loops and/or schedules, etc., in the same amount of time and using the same computing resources. These three benefits, or any other possible benefits that can be derived from optimizing the QA optimizer, can also be combined together as appropriate. Such improvements or optimizations of the QA optimizer will be referred to herein as relating to the efficiency of the optimizer—and the skilled person can then translate these efficiency gains however they see fit depending on their needs or requirements.

Oftentimes in the Field Service industry, a schedule is usually formulated with the aim of achieving: maximal utilization of a workforce; improved service levels; reduced resource consumption; and minimised service costs. A schedule can refer to a scheduling or assignment of tasks or jobs to one or more persons (e.g. technicians and/or drivers, etc.) for a time period or time and taking into account one or more hard and/or soft constraints. In one example, a workforce consisting of 30 service technicians are to be assigned 300 tasks of varying durations over a 10 day scheduling horizon, with each task requiring the singular or combined application of 20 different skills. This example is further complicated by the requirement that the schedule must also adhere to a set of 20 hard and soft constraints. In this context, generating an "optimized" schedule—that is, a schedule which is expected to be one of the best possible feasible schedules for assigning tasks to individuals or which is a good enough feasible schedule can in some cases involve comparing a vast number of possible schedules so as to select one believed to be the best or one of the best ones. As a result and as mentioned before, such optimization is typically carried out by a heuristic program on a computer because of the complexity and combinatorial nature of scheduling. The number of configurations a schedule can take grows exponentially even for only modest increases in the number of tasks or service technicians. As such, it is infeasible to perform an exhaustive search for the best possible formulation of a real-world schedule. Clearly, optimizing this schedule selection or identification is a non-trivial endeavour which is thus generally implemented on a heuristic program on a computer. In the case of a QA optimizer, while the use of a QA optimization process has been mentioned in the context of a simplified VRP problem, such an academic approach is not scalable and not applicable to the identification of a schedule in a more complex environment—such as a FSS environment—where a much larger number of tasks, worker, hard constraints, soft constraints and costs parameters are involved which each affect the suitability of a schedule both individually and in combination with the others elements. As a result, the present disclosures discusses teachings regarding how an actual implementation of a QA optimizer can be adapted or modified with a view to improving its efficiency and to making this the QA optimizer useable in complex cases.

The heuristic which is central to QA optimization is inspired by the quantum tunnelling phenomenon described in the scientific field of Quantum Mechanics. This tunnelling effect is simulated and utilised to make determinations about what are good, and what are poor but promising schedules. This can be better understood with reference to "Brief description on the state of the art of some local optimization methods: Quantum annealing" [2] and reference [1]. In the interest of simplification, this optimization can be viewed as taking a subset of all possible schedule configurations as input, which represents different possible solutions. Each member or solution can then be repeatedly reformulated in reference to a "goodness" value and to each other (using for example interactions between solutions). In this context, a "goodness" value can for example be derived from a difference in costs between a current schedule or solution and a candidate schedule. Under suitable conditions and with enough time, this ensemble is expected to improve statistically, containing better configurations. During this process, 'connections' between members or solutions are continuously created and broken. Such connections are made when members exhibit similar states or features. When enough similarity exists, the members can 'tunnel' along this connection and acquire or 'fix in' the features or states of another member. Viewed from a different perspective, when enough connections or similarities exist between solutions, a conceptual 'tunnel' can be formed, through which the states/features of one solution can be transmitted to, or can affect, another. As a result, the more similarities there are between solutions, the greater is the chance of replacing one solution with another. In other words, short-cuts can be taken (by simulating a quantum tunnelling effect) to arrive at schedule configurations which would ordinarily be unreachable (for example using a conventional comparison with a neighbour), or which would require a much longer sequence of operations to reach.

To simulate the quantum tunnelling effect and to improve the efficiency of the application of the quantum algorithm for optimizing schedules, it is herein discussed different ways in which the QA optimizer can be configured and/or applied in practice, wherein these are specifically provided for scheduling optimization and in particular for computer implemented optimizations and optimizers. An example of a QA optimizer and QA optimizing process will now be described in more detail wherein, in this example, several of the different teachings discussed herein are all implemented in this single example. However, it will be clear from the discussion in the present disclosure in its entirety that at least some of these teachings can be provided independently from the others and/or as optional additions to the others.

While it is running, a QA optimization process will carry out operations (multiplication, summing, etc.) between the spins of the different one or more replicas used by the process, wherein a spin can be in one of two opposite states "+1" or "−1" (representing a spin state in physics when continuing with the quantum physics analogy). It is noteworthy that a "replica" does not refer to an identical copy of another element but is used to refer to one of a set of elements which is processed by the QA optimizer. Typically, a QA optimizer will run on a set of P replicas, with P≥3, corresponding to P schedules and the sets of P replicas and schedules are expected to improve over time, as mentioned above. A schedule, i.e. a set of associations between tasks and workers at certain times, can be represented using +1/−1 with a view to being able to be processed by an actual optimizer. In the context of a QA optimization, P replicas representing or associated with P schedules in this manner could then be input into the QA optimizer which is then expected to help identify a suitable schedule. While the use of such a QA optimizer can be expected to facilitate or improve the identification of suitable schedules compared to non-QA optimizers, any advances that can be made in or provided for increasing the efficiency of an actual computer implementation of the optimizer can provide significant savings in computing resources and/or time required to identify a suitable schedule. It is discussed herein how the efficiency of the computer implementations of such a QA optimizer may be further improved using one or more of the following techniques, wherein these teachings are directed to the specific problems faced when implementing a QA-type optimizer (which relies on a very different logic and approach compared to other optimizers) and when implementing this specific type of optimizer using a computing device (which again comes with a range of limitations which can affect the efficiency of the optimizer).

In the example of the present disclosure and with reference to FIG. 1, a replica 100 includes at least two portions: a schedule portion 101 and a (Boolean) encoding portion 102. Generally the term encoding is used herein to refer to a data structure encoding a schedule, e.g. encoding schedule data corresponding to a schedule. The replica 100 may also optionally include an additional "other attribute portion" 103 if appropriate. Typically the schedule portion 101 comprises the actual schedule to which the replica relates, i.e. the associations of tasks to the workforce, while the encoding portion 102 comprises a data item or encoding for—and derived from—at least part of the schedule. The encoding portion is the portion that is actually passed through the QA optimization loop, that is, it is the portion that represents spins in a +1/−1 state and which can interact with each other in a QA optimization. Depending on the context, in this or other documents, "replica" can sometimes refer to this encoding portion 102 only while in other cases a replica can refer to both the schedule and the data item that encodes at least a part of the schedule. In this example, the schedule encoding is a Boolean encoding, however in other examples the encoding may not be a Boolean encoding, as will be clear from the discussion below.

Returning to the metaphor with quantum physics from which the QA optimization originates, this quantum model describes a lattice of interacting 'spins' which can each take the value {−1, +1}. The lattice is subjected to a magnetic field at a very low temperature. At each site of the lattice, the spin value is recalculated using a function of the field, the temperature, and the interaction of neighbouring spins. As the field is decreased, the lattice undergoes a phase change wherein the spins tend to become 'aligned' and consequently place the entire system in a low energy state. In this parallel between scheduling optimization and quantum physics, a low energy state for the entire system corresponds to a low cost for the entire schedule.

Previous quantum algorithms have used spin encodings to simulate the Ising Model lattice, such as in [1]. These designs are severely limited in application because they are dedicated to representing simplistic problems such as CVRP. CVRP only has a single constraint, such that the (symmetrical) two-dimensional matrix generally used to represent connections between customers for CVRP problems is not suitable to use in more complex situations. This arrangement only allows for optimization on the basis of distance alone. It would be impractical, if possible at all, to extend this representation to encompass time windows, scheduling conflicts, or more generally any other parameter or element or a more complex schedule. Generally, it can be very challenging to find a data structure which is suitable for encoding a schedule and which is suitable for use in a quantum annealing optimization process, e.g. comprising numerical data values for data entries which can interact with corresponding data entries for a different schedule during the quantum annealing optimization. From this perspective, it can therefore be desirable to identify a data structure that is suitable for encoding a schedule which can be used for example in a computer implemented quantum annealing optimizer and which is provided preferably with a view to providing a fast and efficient optimization.

In accordance with the present disclosure, while the encoding includes at least a portion derived from the schedule itself, the encoding also includes additional information which does not represent the schedule as such. The additional information is derived from the schedule and additional parameters relevant to the identification of a suitable schedule, such as hard constraint information for the schedule. Such additional information does not encode information that forms part of the schedule, but with the use of this additional information, the overall performance of the optimizer can be expected to improve for reasons discussed below.

FIG. 2 illustrates an example encoding or data item 200 which encodes a schedule in accordance with an example of the present disclosure. In this example the encoding 200 is represented as a table with rows corresponding to workers and the columns corresponding to different sub-sections of the encoding. While this has been represented as a table, this can in other examples be, or be represented as, a one-dimensional array or in any other suitable form or using any suitable data structure. For the sake of clarity this has been arranged logically as a table in the example of FIG. 2. For each worker, the table provides attributes which, given the business application considered each time, are to be optimized for. As this example uses a binary encoding, each cell of this table can assume a binary value {0, 1} which simulates the {−1, +1} spin (following the quantum physics metaphor, the spin is for the spin at each site of the lattice in the Ising Model).

The encoding of FIG. 2 comprises:
a first schedule portion which indicates whether the workers are busy (i.e. have been allocated a task) at a time or during a time period. In this example this is done by having all of the relevant times or time periods as columns and, for each column (time or time period) and for each row (worker), a 0/1 value indicates whether the worker is available/busy at this time or during this time period.
a hard constraints portion which indicates whether any hard constraint is violated by the task allocations in the schedule. In this example this is done by having all of the hard constraints as columns and, for each column (hard constraint) for each row (worker), a 0/1 value indicates whether the task allocations for the worker violate this hard constraint. For example, 0 indicates a violation of the hard constraint while 1 indicates that the hard constraint is satisfied.

a soft constraints portion which indicates whether any soft constraint is violated by the task allocations in the schedule. In this example this is done by having all of the soft constraints as columns and, for each column (soft constraint) for each row (worker), a 0/1 value indicates whether the task allocations for the worker violate this soft constraint. For example, 0 indicates a violation of the soft constraint while 1 indicates that the soft constraint is satisfied.

a schedule conflict portion which indicates whether the task allocations in the schedule include any conflicting associations, that is if any worker has been allocated more than one tasks for the same time or time period. In this example this is done by having all of the time or time periods as columns and, for each column (time/time period) for each row (worker), a 0/1 value indicates whether the worker has been allocated more than one tasks for this time or time period. For example, 0 indicates a conflict in the task allocation while 1 indicates that the task is not causing any conflict at this time/for this time period and for this worker.

a job assignment portion which indicates whether a task has been allocated to a worker. In this example this is done by having all of the tasks as columns and, for each column (task) for each row (worker), a 0/1 value indicates whether the worker has been allocated this task.

The encoding 200 may further include any number of additional sections or portions as deemed necessary or appropriate (see the "possible extension" section in dashed line in FIG. 2), for example taking into account any element or parameter or combination thereof that may affect the cost of a schedule and/or whether the schedule violates any constraints. For example, the schedule could include an additional portion relating to the salary range or charging rate of the worker. The salary or charging rate associated with a worker involved in carrying out a task can also affect the outcome of the cost function for the schedule such that it is one of the parameters that will affect how to optimize the selection of a suitable feasible schedule as well.

FIGS. 3-6 illustrate example of technicians, constraints, tasks and of a possible corresponding encoded schedule in accordance with the present disclosure. FIG. 3 illustrates an example of workers data 300 which identifies, for each worker, their set of skills and their location. FIG. 4 illustrates examples of hard constraint data 400 and soft constraint data 410 which identifies hard and soft constraints for the allocation of tasks, respectively. In this example, the hard constraint data identifies two hard constraints: a first hard constraint that a task must start on time and a second hard constraint that the worker carrying out the skilled must have the appropriate set of skills required for carrying out the task. It is noteworthy that these are only illustrations and, in other example, a different set of hard constraints may be used. For example, hard constrain h0 of hard constraint data 400 may in other examples be considered a soft constraint only which would tried to be met but which does not render a schedule infeasible if violated. The hard and soft constraint data can be defined depending on the situation at hand and depending on the requirements identified for the task allocation situation under consideration. The soft constraint data 300 of the example of FIG. 2 identifies two soft constraints, a first soft constraint that overtime should be avoided and a second soft constraint that the location of the worker and of the task should be the same, if possible. While these soft constraints will not render a schedule infeasible, they can affect the output of the cost function of a schedule as a worker doing overtime or travelling over longer distances can increase the operational costs of and/or the efficiency of actually carrying out the schedule.

FIG. 5 illustrate an example of task data 500 which identifies a set of tasks to be allocated to the workers. In this example, each task is associated with a specific start time period, duration, set of skills requirements and location. In this example, only four time periods $t_0$-$t_3$ are considered. Finally, FIG. 6 is an illustrating of data encoding a schedule 200 for allocating the tasks of the task data 500 to the workers of workers or workforce data 300 for the relevant time four periods, wherein each cell or entry in the table provides information relevant to the portion it is in. This encoding illustrate the schedule which consist in allocation task $j_0$ (corresponding to $t_0$-$t_1$) to worker $O_0$, task $j_1$ (corresponding to $t_1$) to worker $O_1$, task $j_2$ (corresponding to $t_1$-$t_3$) to worker $O_3$ and task $j_3$ to worker $O_2$. As a result, the scheduling entry for worker $O_0$ at $t_1$ include "1" because the worker has been allocated a task ($j_0$) at this time while the entry for the same worker at $t_2$ comprises "0" because the worker has not been allocated any task at this time. While the encoding 200 comprises a schedule portion and a job assignment portion, which both reflect the actual schedule i.e. the allocation of tasks to the worker, the encoding 200 further comprise information derived from the schedule but not directly reflecting the content of the schedule. In other words, these portions do not reflect the allocation of task to the workforce, i.e. the schedule that is to be optimized, but reflect additional information that can be relevant to the optimization of the schedule. That is, the encoding 200 of FIG. 6 comprises a hard constraint portion, a soft constraint portion and a conflict portion which contain additional information which do not represent schedule i.e. which do not represent information relating directly to the allocation of tasks to a workforce. FIG. 6 also illustrates how the encoding data for each worker can be represented as a single variable, here represented as a 64 bits hexadecimal value. In other examples, the entire table could be represented as a single array "110011111111100001001110111101000011111111110001 0111111011110010" in this example, which can also be represented in any suitable notation, e.g. a hexadecimal notation. This additional section has been included in FIG. 6 for the sake completeness only and does not form part of the encoding 200 as such.

In the example of FIG. 6, the schedule can be fully reconstructed from the encoding 200. However, in other examples it may not be possible to uniquely identify the original schedule used for generating the encoding. Where the schedule may be fully and uniquely obtainable from the encoding, it may be decided that it is not appropriate to store the schedule 101 with the encoding 102 (200) of replica 100 for example with a view to reducing the amount of data to be processed or it may be decided to include the schedule 101 in the replica 100 as it may be used for quick access to the schedule (without priori reconstruction for example) and/or for quick modification of the schedule when needed. In other words, it may sometimes be quicker to include the schedule 101 in the replica 100 so that it can be quickly retrieved and referenced, even when it is theoretically not required in replica 100. Where the schedule may not be fully obtainable from the encoding 200, it may be decided to include the schedule 1001 in the replica so as to have quick access to the schedule associated with the encoding 102, or it may be decided that it may be more appropriate to store the schedule 101 elsewhere so long as the schedule associated with the encoding can be retrieved (e.g. the other attribute data 103 may be used to include a reference to the schedule or to how to/where to find the schedule associate with the replica 100 and encoding 102).

Therefore, in accordance with the present disclosure, in addition to providing data representing the schedule in a form that is specially adapted to be processed by a computer for carrying out a QA optimization process, the encoding also provides data representing additional information. In one example, the encoding comprises at least a schedule portion comprising schedule data indicating whether the workers of the workforce have been allocated a task during the different relevant time periods and a hard constraint portion comprising data indicating whether any of the hard constraints is violated by the schedule. By providing this additional information in the encoding for the schedule, the encoding can not only be provided in a form that makes it possible to be processed by the program or logic implementing the QA optimizer, but it also include information not directly representing the schedule. Including this additional data in the data set provided to the QA optimizer has been found, statistically, to reduce the computing resources required for implementing the QA optimizer.

It is also noteworthy that while the encoding of the schedule will include schedule information or data as such, it is counter-intuitive to include hard constraint information in the data as hard constraint information helps identifying which schedules are feasible and which are infeasible and, conventionally, infeasible schedules are always eliminated or rules out from the search because they are known to be unsuitable schedules. For reasons that will be apparent from the discussion below, it is proposed that in some examples of the present disclosure, infeasible schedules are not screened for and not eliminated from the search and are in fact included in the search for a suitable schedule, despite being aware that these schedules are known to be unsuitable. As further discussed below, by including a hard constraint portion in the encoding generated for a schedule, the resources required for implementing the QA optimizer can be reduced.

In one example, the encoding for the schedule (and comprising the additional information as per the discussion above) can be a binary encoding which further facilitates the application of a quantum annealing optimization for simulating the quantum tunnelling effect in scheduling in an actual computer-implemented optimizer. While the encoding (sometimes refer to as the replica in academic discussion of the QA optimization process) which is processed by the optimizer in accordance with the QA simulation process has values that represent a spin i.e. $\{-1; +1\}$, it has been found (for reasons that will be further discussed below in respect of the implementation of the optimizer) that the operation of a computer implemented QA optimizer can be improved by providing an encoding in a Boolean form, i.e. with values selected from $\{0; 1\}$. Therefore, while some encodings 200 can be comprise "spin" entries, in other examples other encodings 200 can comprise binary entries with a view to enhancing the implementation of the QA optimizer.

In an implementation of a QA optimizer in accordance with the present disclosure, for the optimizer to process the schedule data to identify a suitable or likely to be suitable schedule, three or more P encodings are arranged into a list, preferably a circular list. This arrangement list is shown in FIG. 7. Modifications can be made to the schedule and/or encodings and interactions occur between corresponding cells of different encodings $200_1$-$200_P$ in the list. In one example, the encoding $200_n$ for a replica n will interact with the encoding for the previous encoding $200_{n-1}$ in the list and with the next encoding $200_{n+1}$ in the list.

Figure 8:
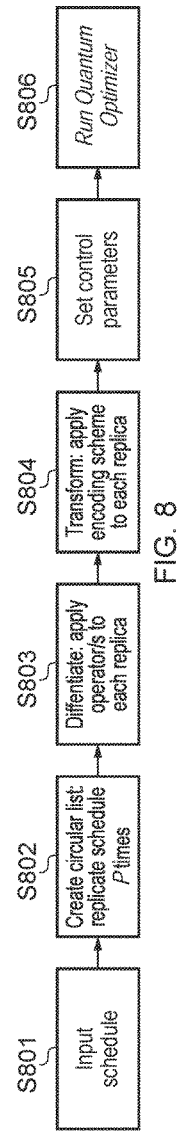
FIG. 8 is a flowchart illustrating example initialization steps for running a quantum optimizer in accordance with an example of the present disclosure.

FIG. 8 is a flowchart illustrating example initialization steps for running a quantum optimizer in accordance with an example of the present disclosure. While the optimizer generally refers to the element carrying out the QA optimization process (S806) with a view to identifying a feasible and suitable schedule, the initialization steps (S801-S805) can be carried out by a pre-processing unit, for example part or all of a process optimization computing device, which is configured to prepare the data to be input into the optimizer with a view to providing data in a manner designed for the optimizer with a view to having the optimizer operating efficiently. In some examples, the pre-processing unit may be part of the optimizer while in other examples they may be separate logical and/or physical elements (see for example the discussion of FIG. 18 below).

Returning to FIG. 8, at S801, a schedule is input, wherein the schedule has been generating based on the set of task and workforce to be associated (taking into account the relevant time period) for finding a suitable schedule. This initial schedule can for example be created using a separate booking system, into which requests for visits by service technicians can be entered. For example, a customer may make a telephone call or send an email to the booking system operator, requesting that a service technician visit their site, within some preferred time-frame, to service or repair equipment and this can be included in the list of tasks to be carried out, wherein the initial schedule is generated based at least in part on this set of tasks. Then at step S802, a list (which can be viewed as a contiguous array of distinct memory structures) of replicas is created and placed in memory of the pre-processing unit. In this example, the list is created using a copy or replication of the initial schedule input at S801 but in other examples different replicas (corresponding to different schedules) can be used in the list when it is created. The first and last replicas can then be linked to form a logically circular list such that, for the last replica in the list, the "next" replica is the first replica of the list and, for the first replica in the list, the "previous" replica is the last replica of the list. In other example the list is not a circular list and may even not be provided as a list but as an array or equivalent structure and the identification of the previous/next replica for each replica in the structure can then be identified accordingly as known in the art. In the interest of conciseness and of simplification of the discussion only, the following discussion will now refer to a circular list. The number of replicas P in this list can determined by the available computational resources (such as RAM, CPU cache/clock) balanced against the business requirements (running time, scheduling horizon), and can for example be selected in the range 40-3000. A larger value for P (i.e. a higher number of replicas processed by the optimizer) can result in using a larger amount of computing resources but in an increase likelihood of identifying a better schedule while a smaller value for P (i.e. fewer replicas) can result in using less computing resources but with the trade-off of being more likely to obtain worse results in terms of schedule optimization. As previously mentioned with respect to FIG. 1, in this example each replica 100 comprises a schedule; a Boolean encoding representing the contained schedule as transformed by the encoding scheme discussed with reference with FIGS. 1-7 above and, optionally, other attributes.

At S803, the replicas in the circular list are differentiated or diversified from one another. While this step is not required as such for the optimizer to carry out the optimization, it has been found that by generating a list having replicas for different or diversified schedules, the optimizer can on average use less computing resources to identify a suitable schedule. In this example this is performed by iterating through the list, applying neighbourhood operators to the schedule contained in each replica. For example, for each replica, a random number I of iterations, in the range 10-10000, can be chosen and, at each of the I iterations, an operator is randomly selected and applied to the schedule 101 of the replica 100. This process is similar to that discussed in respect of FIG. 11, but where the steps S1102-S1103 can be repeated a number of times. In this example, each replica is modified using the schedule input at S801 as a starting point but in other examples, any other schedule already in the circular list can be used. For example, if the replicas are being processed in the order of the list, for each replica to modify/diversify/differentiate, the schedule in the previous replica can be used as a starting point before modifying the replica (e.g. using one or more operators on the schedule).

This process aims at generating data with a high entropy with a view to reducing the resources needed by the optimizer to identify a suitable schedule compared to data having a low entropy (e.g. a list of P identical replicas) when starting with the same set of data (tasks, workers, time periods, constraints and any other data), as mentioned above. In other words, these steps increase the data differences between the replicas that are to be input to the optimizer. Consequently, the processes "Integrate" and "Interact" (discussed in respect of FIG. 10 and FIG. 12 respectively), together are expected to be immediately able to generate the sufficient fluctuations in the Hamiltonian-type calculation, which is a central element when simulating quantum tunnelling effect. Without this process, the optimizer may be required to carry out a number of $M_C$ outer loops which has to be increased by between 10×P and 10,000×P to reach a quality of schedule in the search, thereby significantly increasing the amount of computing resources required by the optimizer. The third process facilitates a reduction in computing resources waste and simplifies the organisation of computer codes into well-defined phases of operation.

For each replica, the encoding 102 in the replica 100 can then be generated or updated to correspond to the schedule 101 in the replica (S804). While this has been presented as being done sequentially, in some examples this step can be carried out at any time after the relevant schedule has been generated or modified and may for example be carried out before and/or in parallel with step S803 in respect of the next replica to be differentiated. Also, this example refers to a replica as illustrated in FIG. 1 but in cases where the replicas 100 include an encoding 102 but no schedule 101 (e.g. if the schedule can be uniquely retrieved from the encoding 102), then the diversification/differentiation can be carried out directly on the encoding 102 (in this case steps S803 is applied to the encoding and S804 becomes irrelevant). At the end of S804, a circular list of P replicas has thus been generated in a format that is now suitable for use with the QA optimizer and wherein the format and content have also been selected in view of the workings of the QA optimizer with a view to reducing the resources required by the optimizer and/or reducing the time required by the QA optimizer to identify a suitable solution.

It is noteworthy that in the example of FIG. 8, the list is a list of "replicas" which in some examples can be taken as referring to replicas as discussed with reference to FIG. 1. In this case, the list of P replicas also provides, inter alia, a list of P encodings as each replica comprises an encoding 200 corresponding to the schedule associated with the replica. In other examples a list of replicas may be created wherein replica may be understood to refer to an encoding such that the list comprises P encodings 200 corresponding to P schedules. For examples, P schedules may be generated and encodings for the P schedules may be generated and stored in an—optionally circular—list of P encodings.

At step S805 (which may be carried out by the pre-processing unit and/or by the optimizer as appropriate), controlling parameters are selected for use by the QA optimizer. This can be selected manually or automatically. In the case of a QA optimizer, these control parameters can include: Gamma $\Gamma$; Delta Gamma $\Delta_\Gamma$; Temperature T; and Monte Carlo steps $M_C$ which are further discussed below. Typically, $\Gamma$ can be chosen by experimentation and can be selected in the 1-5 range. Generally, a higher $\Gamma$ value can reduce the likelihood of the optimizer converging to a suitable schedule in a given time while a lower $\Gamma$ value can increase the risk of the optimizer converging too quickly (and thereby miss potentially valuable schedules in the search. Parameter T (temperature) is a parameter that is usually linked to $\Gamma$ and which can be selected as being in the order of $\Gamma/10$ to $\Gamma/100$. $M_C$ represents a number of time an "outer" loop of the QA optimization process is to be carried out and can be selected taking into account a desired running time, computing resources capabilities (e.g. CPU speed) and experimentation. $M_C$ can for example take a value in the range $5 \times 10^6 - 2 \times 10^9$. $\Delta_\Gamma$ is calculated as $\Gamma$ divided by $M_C$ so as to reduce the weight of $\Gamma$ with each new outer loop of the Mc outer loops as $\Gamma$ can be updated at the end of each outer loop for example to $\Gamma - \Delta_\Gamma$ (see for example the discussion of the example optimization discussed in respect of FIG. 9). It should be noted that in other examples, parameter $\Gamma$ can be updated differently at each additional outer loop such that parameter $\Delta_\Gamma$ may then not be needed or not be defined as such at S805. The roles of these parameters can be better understood with reference to [1] and [2] and to the discussion of FIGS. 9-13 below.

Finally, at S806, QA optimizer is operated with a view to identifying a suitable and feasible schedule from the set of tasks, workers and constraints (and any other additional information that may be relevant and available). The operation of the optimizer when running the QA optimization process will now be discussed.

Figure 10:
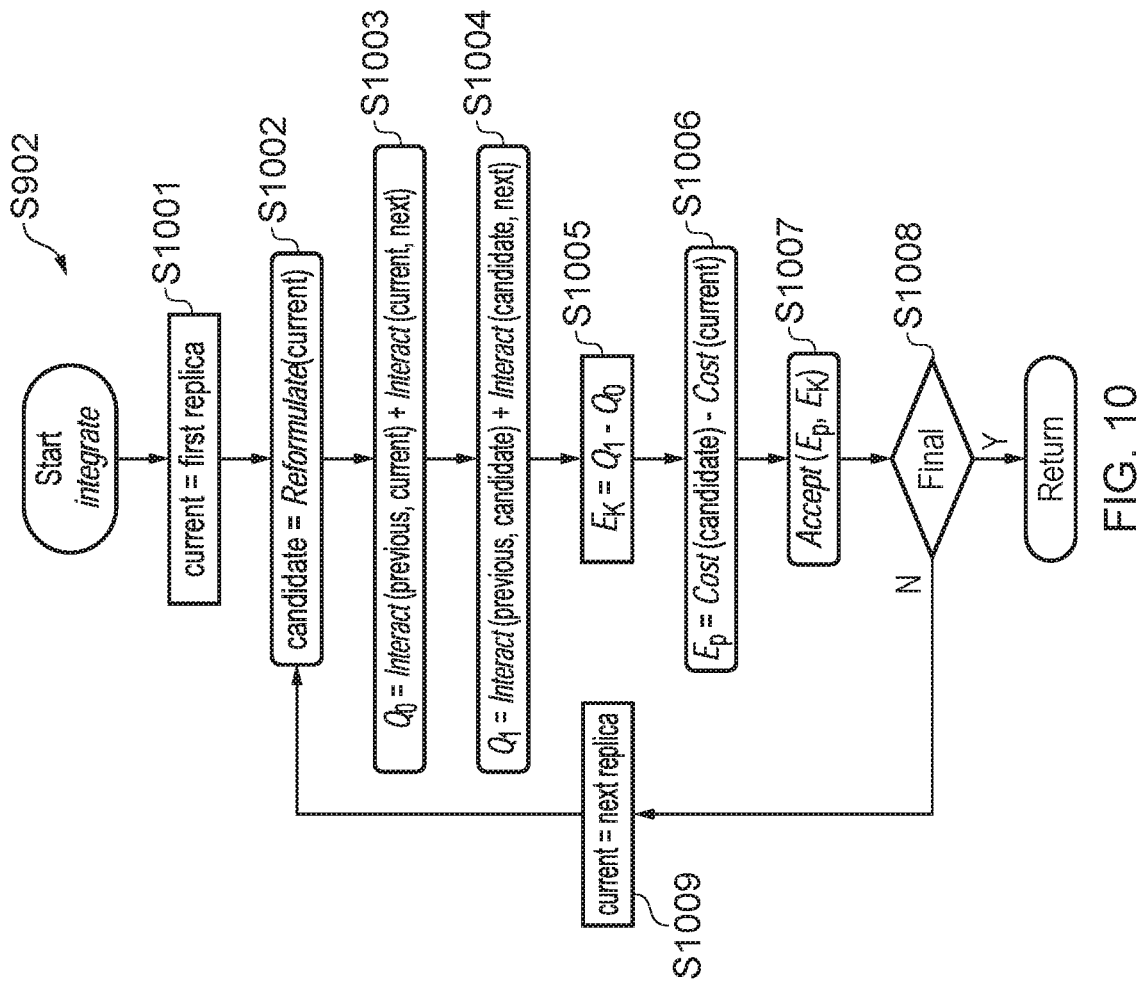
FIGS. 9-10 are flowcharts illustrating example steps for carrying out a quantum optimization in accordance with an example of the present disclosure.
Figure 9:
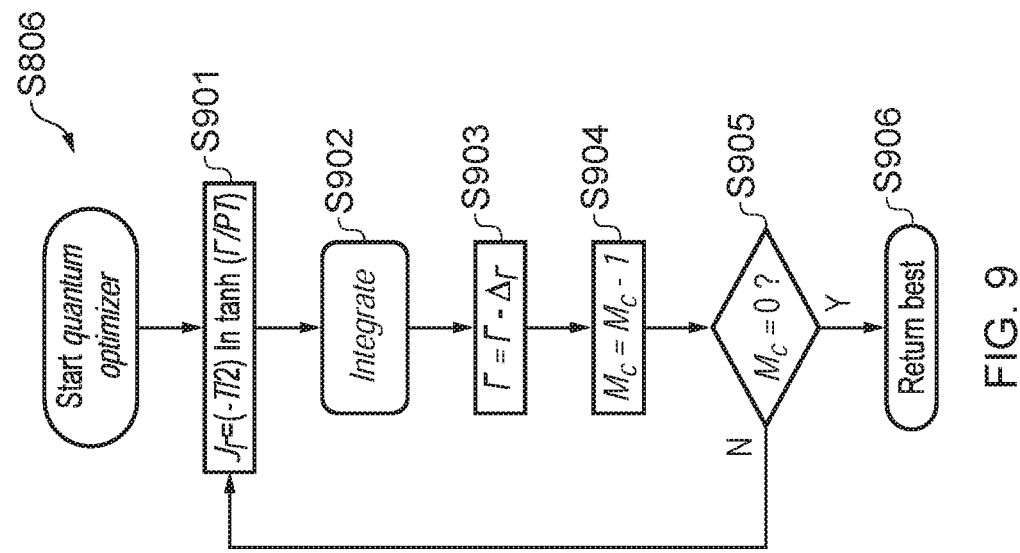

FIGS. 9-10 are flowcharts illustrating example steps for carrying out a quantum optimization in accordance with an example of the present disclosure, wherein the process of FIG. 9 is herein referred to as the "outer" loop of the optimization process and FIG. 10 is herein referred to as the "inner" loop of the optimization process. The outer loop is carried out Mc times (referring here to the initial Mc value used by the optimizer) wherein, at each of the outer loop, the list of P replicas will be updated to a new list of P replicas and the inner loop correspond to the processing, for each of the outer loop, of each of the P replicas in the set of P replicas.

In the example of FIG. 9, a circular list of P replicas and a set of control parameters are taken as input (although in other examples the control parameters may be pre-determined in the optimizer rather than received every time. In this example, the control parameters are Γ, Δ$_Γ$, T, P and M$_C$ as discussed above. The constants Δ$_Γ$, T and P can be placed in storage variables for retrieval by subsequent processes and sub-processes while Γ and M$_C$ (which can both change as the optimizer is operated) are placed in accumulator variables so that subsequent processes and sub-processes can retrieve and modify their current value. Γ is typically decreased by the fixed amount Δ$_Γ$. This results in a reduction in the amount of simulated quantum tunnelling over the course of the outer loop iterations of the optimizer. The expected outcome is that, as time goes, the optimizer is less likely to replace a replica with a different replica and is more likely to replace a replica with a similar replica (or a better replica, as will be clear from the discussion of FIG. 13). Initially the optimization process is expected to consider more different replicas so that it can explore a greater variety of replicas which are potentially remote (i.e. very different) from the replicas in the initial P replicas used as an input (despite these replicas being potentially worse solutions in terms of costs). As times goes, the Γ parameter will decrease and the optimizer will be more likely to select only better solutions similar to the already identified solutions. As a result, the set or list of P replicas is expected to converge around one or more schedules with a relatively low cost due to the initial wide range of exploration (due to the higher initial Γ value and to the simulated tunnelling effect) and due to the later lower acceptance of worse solution and convergence around the most valuable schedules identified.

At S901, the parameter J$_Γ$ is calculated, in case according to the following equation (1):

$$J_Γ = (-T/2) \ln \tan h(Γ/PT) \quad (1)$$

This calculation uses P with current values of the control parameters Γ and T. Equation (1) is an example of calculation of J$_Γ$ which aims at providing a non-linear a parameter which is not linearly-dependent from Γ and T. It is later used in combination with the quantum term Q with a view to affecting the effect of Q over time (i.e. with the number of outer loops which is dependent on the number of outer loops carried out, i.e. to the initial value of parameter M$_C$) in the "Accept" process which is discussed in more detail with respect with FIG. 13.

At S902, the "Integrate" process is carried out, which corresponds to the inner loop discussed in respect of FIG. 10 below. In simplistic terms, the aim of this step is to perturb the current set of P replicas with a view to achieving the convergence effect discussed above.

At S903, the Γ parameter is decreased for the next outer loop (if any). In this example, it is decreased linearly at each of the outer loops by the "Γ/M$_C$" (with the initial M$_C$ value representing the total number of outer loops to be carried out) decrement but in other it may be reduced using any other arrangement, e.g. using a non-linear reduction of this parameter. Then at S904, the M$_C$ parameter is decremented by 1 to reflect that one outer loop has been completed.

At S905, if the parameter M$_C$ has reached "0", then the desired number of outer loops has been carried out and the optimizer can return the best schedule it has found (S906) and if the parameter has not reached "0" yet, the process returns to S901 and repeats S901-S905 for at least one additional time.

In final step S906, a schedule is output based on the optimization process carried out. Generally, this can be implemented using one of two methods (although other methods are not excluded). In one example, the set of P replica is retrieved as last updated by the outer and inner loops previously carried out a number of times, and the P replicas are assessed for identifying the best one of the set, e.g. the replica for a schedule being a feasible schedule and having a lower cost than the others schedules for the set of P replicas. In another example, as the QA optimizer runs, it can keep track of the best replica it has encountered (as this could replica could potentially be later replaced by a worse one and never resurface before the end of the process). Any time a replica with a lower cost (i.e. "with a schedule having a lower cost") than the current best replica is found, this newly found replica can become the new best replica. In this case, at S906 the optimizer can return or output the replica which has been identified as the best encountered while the process was running. The second method is more likely to identify a better replica (for the reasons discussed above) but the trade-off to be made is that it is likely to require additional comparisons which can in turn reduce the speed of the optimizer.

The sub-process, or inner loop, "Integrate" is described in more detail with reference to FIG. 10. The Integrate process takes as an input the current set of P replicas and perturbs them based on the current parameters by going through each replica in the of P replicas and processing them.

First, at S1001, the process is initialized by setting the "current" replica as the first replica in the list (although it could also be initialized to any other of the P replicas in other examples). Then at S1002 a candidate replica is generating by modifying the current replica. This step is further discussed below with reference to FIG. 11. The remainder of the loop comprises steps which will decide whether the candidate replica will replace the current replica in the set of P replicas.

At step S1003, a quantum term Q$_0$ is calculated for the current replica with reference to previous replica, i.e. the replica before the current replica in the circular list and to the next replica, i.e. the replica after the current replica in the circular list. Likewise, at S1004, a corresponding quantum term Q$_1$ is calculated for the candidate replica with reference to the same previous and next replicas. The quantum term is calculated using an "Interact" function which is further discussed with reference to FIG. 12 below. In simplistic/ simplified terms, a quantum term Q can be viewed as being based on a summation of all the interaction energies calculated between corresponding spins (−1/+1) from pairs of encodings. Generally, the greater the difference between encodings, the more Q increases. Likewise, the more two schedules (and thus the corresponding two encodings) are similar, the more value for Q will decrease.

In this example, the quantum term Q$_0$ is the sum of: the interactions calculated for current replica in relation to the previous in the circular list; and the interactions calculated for the current replica in relation to the next in the circular list. Likewise, the corresponding quantum term Q$_1$ is the sum of: the interactions calculated for the candidate replica in relation to the previous in the circular list; and the interactions calculated for the candidate replica in relation to the next in the circular list.

At S1005, the combined quantum term E$_K$ is calculated as the difference between Q$_1$ and Q$_0$ for use by the Accept function (see below). At S1006 a difference in cost E$_P$ between the current and candidate replicas is calculated (i.e. the difference in cost for the schedule in the current replica and the schedule in the candidate replica), also or use by the Accept function (see below). The combined action of S1002-S1005 is that the quantum term E$_K$, will fluctuate from iteration to iteration. This fluctuation can be amplified or attenuated by the sub-process "Accept". Together, these processes are used with a view to simulating the quantum tunnelling effect.

At S1007, the Accept process takes $E_P$ and $E_K$ as an input for deciding whether to replace the current replica with the candidate replica generated at S1002, wherein this decision or determination of whether to replace the current replica with the candidate is determined by a probabilistic function of the terms $E_K$ and $E_P$. Once either the current has been maintained or replace by the candidate replica at S1007, the process moves to S1008 where it is determined if all replicas of the set of replicas process by the inner loop have been processed. If all have been processed, the process can terminate as all replicas have been considered and replaced by a candidate replica if appropriate. On the other hand, if one or more replicas of the P replicas have not been processed yet by the inner loop, the method set the current replica as one of these one or more replicas to be processed and returns to S1002. In one example, the replicas are considered in the order of the circular list but in other examples the replicas may be considered in any other suitable order.

In summary, the combined action of the processes of "Integrate" is to perform a kind of search which is expected to select good schedule configurations, but also less good but potentially promising configurations which could lead, upon further reformulation, to even better schedules. This latter choice is heavily dependent upon the strength of the simulated quantum tunnelling effect, i.e. in the example of FIG. 10, on the strength given to the calculated quantum term $E_K$. The quantum terms or fluctuations which are combined with the cost of a schedule can give the search access to schedules which would be inaccessible to non-tunnelling algorithms such a Simulated Annealing. Such non-tunnelling algorithms search by repeatedly reformulating a single schedule and are thus constrained to follow a direct path from one reformulation to the next. In contrast, "Integrate" effectively performs many (P) searches in parallel, which not only increases the number of schedules which can be explored, but also allows with the use of the quantum term $E_K$, the search to take short cuts, or 'tunnelling', between what would ordinarily be (measured in the number of reformulations) distant schedules. The quantum term can be used affect how far to tunnel (where to search), and can contribute to the acceptance of reformulated schedules (how likely the search is to continue from a given reformulation). In this respect, the operation of the Interact and Accept functions or processes play an important role and they will now be discussed in more detail with reference to FIGS. 12 and 13, respectively.

The effect of the quantum term on a QA optimizer is mentioned in [1] and [2] and conventionally, when a quantum annealing algorithm is applied, spin interactions between neighbours are usually calculated on a per-site basis using $S_A \times S_B$, where $S_A$ and $S_B$ are the neighbouring spin values taking the −1 or +1 value or using $(2S_A-1) \times (2S_B-1)$ if $S_A$ and $S_B$ are in a binary format. In other words, the interaction between replicas is based on a transformation of two spin values into a +1 or −1 value, where +1 indicate a similarity and −1 indicates dissimilarity. The results (taking one of the −1 or +1 values) for the sites are then summed to give a total quantum term for the encoded schedule. The total interaction value gives an indication of the similarities between the two replicas (or encoding) considered. However, this calculation is slow to carry out and scales poorly.

In accordance with the present disclosure, a fast suitable implementation for the calculation for the Quantum term may then be facilitated using a combination of a binary encoding for the schedule and using specifically designed Boolean operations using Boolean algebra which accelerates the calculations and improves the scalability when carried out using a computing device. Rather than using the conventional calculations which, as mentioned above, can be slow to carry out, the following steps can be carried out using a XOR operation and, optionally a NOT operation on binary variables, with only a single non-Boolean operation, using a Hamming Weight function, to derive a value corresponding to the sum previously calculating using non-Boolean calculations and logic. In the example of FIG. 12, the method starts with, at step S1201 setting the value Q to zero wherein, at the end of the method, the value Q will corresponding to the interaction value for two replicas replica1 and replica2.

In the example of FIG. 12, the inputs for the process are: the two replicas replica1 and replica2, in the sense that at least the encoding of the schedules are input and, in this example Interact function the encoding are Boolean encodings (in cases of non-Boolean encodings, the calculation of the interaction function can still be carried out as mentioned above). At S1201, Q is initialized to zero and then, at S1202, a variable A is assigned the first word of the encoding contained by the first replica. For example, for an optimizer implemented on a 64 bits architecture, the variable may be 64 bits longs such that A is then the first 64 bits of the (binary encoding for) replica1. While it may be less than 64 bits long in this case, it has been found that by using all of the capacity of the architecture, the use of the computing resources can be further increased and therefore the speed of the specific implementation of the Interact function can be increased. Likewise, in a 32 bits architecture, A can be selected to be the first 32 bits (or less) of replica1. Step S1203 mirrors S1202 but for the other replica and B is set as the first word of the encoding for replica2 and it is selected to be of the same length as A.

At S1204, a variable C is assigned the result of the bitwise exclusive-or ("XOR") operation A XOR B. C is a bitwise indicator of where the encodings of the replicas, on a per-word basis, are the same. Then at S1205, the Hamming Weight ("HW") of C is subtracted from variable Q. The HW function is a function that takes a binary input and output a number of "1" found in the input, in other words and in view of how C has been calculated, HW(C) provides a measure of the similarities between A and B.

Then, at S1206, a variable D is assigned the result of the bitwise complement ("NOT") operation upon C such that D is a bitwise indicator of where the encodings of the replicas, on a per-word basis, differ. Then at S1207, the HW function is applied to D and added to variable Q to update Q. In this example, HW(D) provides a measure of the differences between A and B.

Finally, at S1208, it is determined whether A and B where the last words of the encodings for replica1 and replica2. In the event that they were, the method can complete and Q can be output as the interaction value for replica1 and replica2. On the other hand, if there is still at least one bit to be processed in the encodings for replica1 and replica2, A and B can then be set as the next words of the encodings of replica1 and replica2 (S1209 and S1210), i.e. the next sequence of bits after the words A and B just processed. In an event where the words are preferably of 32 or 64 bits, the new A and B words can have this preferable length if there are enough remaining bits to be processed and, if there are less than 32 or 64 (or any other suitable number used in the implementation) bits available, then A and B can be set as the next sequence of bits up to and including the last bits for replica1 and replica2. Once steps S1209 and S1210 have been carried out, the method returns to S1204 where the value for C can be calculated.

Due to the binary nature of calculations on a computing device, by implementing numerous steps of this Interact function as a single binary operation, the speed at which it can be carried out on a computing device can be significantly improved. As this function is used several times in the overall optimization of a schedule (4 times in each inner loop, so $M_C \times P \times 4$ in total), these savings translate into considerable savings in the speed at which the optimizing can be carried out on a computing device (or one or more computing devices). Also, as the calculations involved in scheduling optimization can be extremely heavy and as the number of possible schedule generally increase exponentially with the number of parameters, any relatively small improvement in the calculations involved can result in significant time saving and/or significant improvement of the quality of the schedules identified in the same amount of time. This specific implementation of the function measuring the interactions between two replica diverge from the conventional calculation of replica interactions and has instead been designed to be specially adapted to the mode of calculation on computing devices with a view to improving calculation speed.

It is noteworthy that the specific example of FIG. 12 is a non-limiting example of how Boolean algebra can be used to depart from the usual interaction calculation and that, in other examples, other Boolean calculations may be carried out. For example, as the XOR function provides a measure of the similarities between two binary variables, it can be sufficient in some examples to derive the Interact value from a XOR operation comparing corresponding values for replica1 and replica2 and from a HW operation on the outcome of the XOR operation to provide a measure of the similarities (and thus also of the dissimilarities) between the two replicas.

Now turning to FIG. 13, this figure illustrates a flowchart showing an example method for determining the acceptance of a candidate replica in accordance with an example of the present disclosure. The flowchart "Accept" process is a sub-process that is invoked in the final process of the flowchart "Integrate" in FIG. 10 when deciding whether the current replica will be replaced by the candidate replica in the set of P replica optimized by the optimizer. The inputs are: $E_P$ (indicating a cost difference between the current and candidate replicas); and $E_K$ (the quantum term for the current and candidate replicas, calculated using an interaction function).

At S1301, based upon the sign (zero negative) of the difference in cost $E_P$ a decision is made to either move to S1302 or to S1306. A negative value for $E_P$ means that the current replica in the circular list has a higher cost than the candidate replica or, in other words, that the candidate replica is better than the current replica. In this case, the method moves to S1306 where the current replica is replaced with the candidate replica. The method can then terminate. On the other hand, if the candidate replica has a higher cost than the current replica ($E_P>0$), the method does not terminate here and moves on to S1302 where a Hamiltonian-type calculation is performed. This calculation (again inspired by the quantum physics metaphor) is the sum of: the Quantum term $E_K$ scaled by $J_\Gamma$ (previously calculated and stored by the "Quantum Optimizer"); and the difference in cost $E_P$ averaged over the number of replicas P in the circular list. The example calculation used in FIG. 13 relies on the following equation (2):

$$H=(E_P/P)+J_\Gamma E_K \qquad (2)$$

The result of this calculation H is stored for subsequent use. Since $J_\Gamma$ is reliant upon $\Gamma$, which decreases (e.g. by $\Delta_\Gamma$) for each iteration of the outer loop, then the term $J_\Gamma E_K$ will diminish over time. This reduction in the effect of the quantum term means that as time progresses, "Accept" makes decisions increasingly reliant upon cost $E_P$, and thus is more likely to accept solutions based on cost considerations only and less likely to accept a worse solution. As a result, there will be an expected convergence towards a single schedule configuration in each replica.

At S1303, it is determined whether H is negative or note, wherein if the Hamiltonian calculation H is negative, the current replica in the circular list is replaced with the candidate replica (S1306) and the method can end. As previously mentioned, as the number of outer loops increases, the H parameter will give more weight to the cost comparison between the current and candidate replicas and less weight to the component based upon the similarities or dissimilarities between the replicas (between the current and previous/next replicas and between the candidate and the same previous/next replicas). This can provide a simulated tunnelling effect: if a cost barrier is low enough, tunnelling can be more likely to occur.

On the other hand, if H is positive, the method moves to S1304 where a random real number R is selected in [0,1]. Then at S1305, a determination is made as to whether R meets the criterion defined by equation (3):

$$R<e^{(-H/T)} \qquad (3)$$

Because of the random element in equation (3), this is effectively a probabilistic decision which is made on whether to replace the current replica with the candidate replica (S1306) if the criterion is met, or to terminate the Accept process (and thus to maintain the current replica) if it is not met. When this probabilistic decision is made using the specific equation (3) used in the example of FIG. 13, the decision is effectively based on the sign of a value chosen from the distribution defined by the exponent of (-H/T), relative to the real random number R. This third determination can be viewed as a probabilistic 'tunnelling' effect which can take place. Just as for the determination in S1303, as the cost barrier increases in height, a diminishing amount of tunnelling can occur (although the factor taken into account will be different from those considered as at S1303).

In summary, the combined action of the processes of "Accept" is to determine which replica, the current or candidate, to maintain in the circular list in the position for the current replica. If the candidate's schedule is better in terms of cost, the candidate replica will automatically take the place of the current in the circular list. If however the schedule of the candidate replica is not better in cost, then the quantum term is used to determine the probability that the candidate replica should replace the current. This "Accept" determination is a key part, along with "Interact", of the simulated tunnelling effect.

Returning to FIG. 11, which illustrates a flowchart with an example method for generating (or reformulating) a new schedule from an existing schedule, a reformulating process will now be discussed. This reformulation may be used at one or both of: the generation of suitable data by the processing unit when generating the list of P replicas/ encodings in preparation for the QA optimization process but also in the inner loop of the QA optimizer, when identifying a candidate replica before determining whether to replace the current replica with the candidate replica (thereby perturbing the set of P replicas).

In some examples, reformulating a schedule comprises reassigning one or more tasks amongst one or more service technicians (workers) for an existing schedule. Reformulating a schedule can for example be performed by a collection of computer codes known as neighbourhood operators, or for brevity, operators. There are many types of operator, each designed to perform a specific kind of reformulation, examples of which are: the MOVE operator, which moves a task from one service technician to another; the SWAP operator which exchanges tasks between two service technicians; and the REVERSE operator which reverses the order of a sequence of tasks for a service technician. Most operators employ a pseudo-random number generator to stochastically select tasks, technicians and assignments. Therefore reformulated schedules are non-deterministic in functional proportion to the period-length and distribution of the random number generator.

In the example of FIG. 11, the example reformulation process takes as inputs: a replica (to be reformulated).

At S1101, a copy of the schedule contained in or corresponding to the current replica is created. In examples where the current replica that has been input is to be replaced by the reformulated one, this step may be skipped. Then at S1102, an operator is selected at random from a set of neighbourhood operators, and then applied to the duplicated schedule (S1103). In the example of FIG. 11, the method then moves to S1104 where a reformulated replica is created from the modified schedule (e.g. by generating the corresponding encoding) and can then be output by the method.

In other examples, steps S1102-S1103 can be repeated a number of times, for example a pre-determined number of times or a number of time selected at random within a range (see for example the discussion of S803 in respect of FIG. 8 above) if deemed appropriate.

In brief, the Reformulate process aims at providing a new schedule, encoding and/or replica which is derived from the input schedule, encoding and/replica and is a key component in the exploration of schedules during the QA optimization at in the diversification of the data to be input to the optimizer.

In accordance with an example of the present disclosure, the data to be input into the optimizer may also be generated so as to possibly contain infeasible schedule (i.e. schedules which violate at least one hard constraint) and the optimizer can be modified so that the cost function can take into account the hard constraint on the calculation. Previous optimization approaches screen for infeasible schedule, as they are known to be unsuitable solution so as to not search them. The rationale is that, because they are known to be unsatisfactory schedules which will not be selected as an optimized schedule at the end of the search and as they are considered not representing a worse scheduled which could potentially be good starting point for searching for further schedules. In other words, they are easily identifiable (with a check against the hard constraints) and are known to represent bad solutions are thus eliminated. Surprisingly, experimentations have shown that, by tuning the data input into the optimizer and by modifying the program for carrying out the optimization, the speed of the program can in fact be increase by not screening for infeasible solutions, for reasons that will be clear from the present discussion in combination with the discussion of FIGS. 9-13 above, and this has been found despite the infeasible schedule being clearly not solutions that, intuitively and in accordance with the current practice in scheduling optimization, should not be worth searching (i.e. including in the search space for a suitable schedule).

When including infeasible solutions adaptations can be made, for example the data generated for the optimizer can be generated so that it can include one or more infeasible schedules. In practice this can be done by generating schedules from the workforce, set of tasks and time periods, regardless of any hard constraints (in contrast to other optimization processes where only feasible schedules are generated) and by using a set of P replicas or schedules which can thus include non-feasible solutions. Additionally, the cost function is conventionally designed to estimate the cost of a feasible schedule as non-feasible schedules have been eliminated before and will therefore not have their cost estimated at any stage. The cost function can therefore be modified to take the hard constraints into account such that schedules which are infeasible are being given a high cost relative to feasible schedules. For example, if the cost function is to be minimised (the same teachings apply when the cost function is to me maximised), the cost of infeasible schedules can be generated to be above the maximum cost for the feasible schedules. If for example, based on the specific cost function at hand, the feasible schedules should have a cost in a [m; M] range, the cost function can be defined so that, if a hard constraint is violated, it adds an extra cost (M-m) to the overall cost. As a result, all infeasible schedules will have a higher cost than feasible schedules. Other cost functions may be provided that output a relatively higher cost for infeasible schedules compared to the cost for feasible schedules and, in some examples, a cost range $[m_i; M_i]$ for infeasible schedules which is higher than the cost range $[m_f; M_f]$ for feasible schedules, that is wherein either $m_i \geq m_f$ and $M_i \geq M_f$ or wherein $(M_i - m_i)/2 \geq (M_f - m_f)/2$ if comparing median values. In some examples this can be achieved by having a cost for infeasible schedules which is always higher than the cost for feasible schedules (i.e. $m_i \geq M_f$), although in other examples there may be an overlap between the cost ranges for feasible and infeasible schedules. As a result of and in view of the discussion above, with a relatively higher cost for infeasible schedules, it is expected that the higher costs for infeasible schedule will reduce the likelihood of having infeasible schedules in the set of P replicas. In effect, as time progresses, the infeasible schedules would be expected to be replaced by the feasible schedules, e.g. either because of a lower cost for a feasible schedule or because of a higher cost but a likely low cost barrier between the feasible and infeasible schedules (see the discussion of FIG. 13 for example). While including infeasible schedules does waste some of the computing resources on processing schedules known to be unsuitable and will increase the time needed to have feasible schedules only, it has been found that by not screening eliminating them from the input data and not screening for them while the optimizer is running, surprisingly and counter-intuitively, significant time savings can be made (for example, every time a candidate schedule is generated in the inner loop) which compensate for the potentially wasted resources at other stages. Additionally, while a schedule may be infeasible, it is also believed that they could still represent a valuable starting point for searching for a feasible and low-cost schedule such that the "area" explored by the search can be extended. This is expected to be another reason explaining why the optimizer has been found to be more efficient when (potentially) using infeasible schedules. Therefore, by modifying the implementation of the optimizer to be able to process infeasible schedules and by generating data to be input which can include infeasible schedules, the operational speed of the optimizer can be increased.

Additionally, this can be further accelerated by include a hard constraint portion in the encoding for the schedule, as for example discussed with reference to FIGS. 2-6. Although this is not necessary to include this portion to be able to use (potentially) infeasible solutions in the optimizer, by including the hard constraint portion, this is optimized at the same by the optimizer and the infeasible schedules are thus expected to be likely to be replaced quicker by feasible schedules. This is believed to be due to the fact that, by including the hard constraint portion within the (binary or not) encoding for the schedules, the similarities between feasible encodings/replicas (for a feasible schedules) can be increased such that, as result of the simulated tunnelling effect, the presence of other feasible solutions (which is already more likely due to the relatively lower costs for feasible solutions) in the set of P replicas will have the effect of further increasing the likelihood of an infeasible schedule with a feasible schedule. In other words, while the hard constraint portion may not be provided in encodings of some implementations, if infeasible solutions are not screened for and are potentially used in the optimizer, including a hard constraint portion in the encoding can further accelerate the speed of the optimizer. Therefore, by providing this modified data structure adapted to the QA optimizer, the operation of the optimizer can be improved. It is also noteworthy that in view of the infeasible schedules being conventionally screened for and eliminated from the optimization, it is completely counter-intuitive to include a hard constraint portion in an encoding for a schedule to be optimized. This is also in addition to conventional schedule encodings being only representations of the schedules such information representing allocations of tasks to a workforce for the relevant time periods or other type of information in cases the schedules are defined differently in other applications (see for example a travel map a travelling salesman problem).

Therefore, in accordance with the teachings of the present disclosure, different examples have been provided with a view to improving the operation of a QA optimizer wherein the examples have been designed so that the data generated for being input into the optimizer and so that the corresponding computer-implementation of the optimizer can increase the operational speed and efficiency of the implemented optimizer. It is noteworthy that while different aspects have been discussed herein (e.g. binary calculations, adaptations to process infeasible solutions, new data structures for encoding the schedules, etc.), these aspects can be provided in isolation in some examples and in any suitable combination in other examples (wherein such combinations can also provide additional benefits).

FIG. 14 is an illustration of an example method of encoding a schedule into a structure for use in a quantum annealing optimization process in accordance with an example of the present disclosure. The method starts and at S1401, schedule indicator data entries are determined based on whether each of a set of recorded tasks has been allocated to one or more of a plurality of identifier data names in one or more of a first set of time periods to generate schedule portion data. For example, the schedule indicator data entries can each be assigned a schedule indicator value accordingly.

Likewise, at S1402, hard constraint data entries are determined based on whether at least one of a plurality of hard constraints has been violated by the allocation of the first set of recorded tasks to one or more of the plurality of identifier data names in one or more of the first set of time periods to generate hard constraint portion data For example, the hard constraint data entries can each be assigned a hard constraint indicator value accordingly.

Once S1401 and S1402 have been carried out (for example sequentially, in parallel or partially in parallel), the method performs steps S1402 where a data structure is generated based on the determined schedule portion data and the determined hard constraint portion data, the data structure being for use in a quantum annealing optimization process. Accordingly, the first schedule data can be encoded into a data structure that can be used use in a quantum annealing optimization process.

FIG. 15 is an illustration of an example method of applying a quantum annealing optimization process for identifying a candidate schedule in accordance with an example of the present disclosure. The method starts and at S1501, a set of P schedules is generated based on first data representing a first set of time periods and second data representing a set of hard constraints. Each of the set of P schedules allocates a set of tasks to a workforce for the first set of time periods and the generated set of P schedules comprises an infeasible schedule based on the set of hard constraints.

Then at S1502 a set of P replicas is generated from each of the set of P schedules with one of the P replicas being generated from the infeasible schedule and wherein each of the set of P replicas comprises schedule encoding data encoding one of the set of P schedules. Accordingly, from the set of P schedules, a corresponding set of P replicas is generated where each replica includes a data encoding the corresponding of the P schedules and wherein the set of P replicas comprises a replica corresponding to the infeasible schedule previously generated.

At S1503, a quantum annealing optimization process is applied to recursively optimize the set of P replicas, wherein the quantum annealing optimization process uses at least a cost function configured to output a cost for each of the generated set of P replicas to determine a ranking for the set of P replicas. Accordingly, based on the cost function, a ranking can be calculated for the generated set of P replicas to recursively update the set of P replicas (and, at the next recursion, the cost function can be used to optimized the current set of optimized P replicas) based on the ranking determined by the cost function for the generated set of P replicas (and the recursively optimized set of P replicas at any recursion of the optimization process.

In this example, the method moves to step S1504 where one of the recursively optimized set of P replicas is identified based on the ranking determined by the cost function. The one replica identified may be from the optimized set of P replicas from the last recursion of the optimization process or from any other intermediate recursion of the optimization process, as discussed above.

FIG. 16 is an illustration of an example method of applying a quantum annealing optimization process for identifying a candidate schedule. At first, a set of P schedules (P≥3) is generated at S1601 and at S1602, a quantum annealing optimization process is applied by recursively updating the set of P schedules. For each schedule Si of the recursively updated set of P schedules, an alternative schedule Si' is generated and is compared to the each schedule Si based on a comparison of a quantum term for Si and of a corresponding quantum term for Si'. An illustration of a quantum term calculation is further discussed in respect of FIG. 17 below which discusses the calculation of an interaction function from which a quantum term is derived. For example, and as previously discussed, the quantum term for $S_i$ or $S_i'$ may be based on interactions between $S_i$ or $S_i'$, respectively, and the schedules before and after the schedule $S_1$ in the set of P schedules (or replicas), i.e. $S_{i-1}$ and $S_{i+1}$. Then, at S1603, a candidate schedule is identified based on the outcome of the quantum annealing optimization process.

Figure 17:
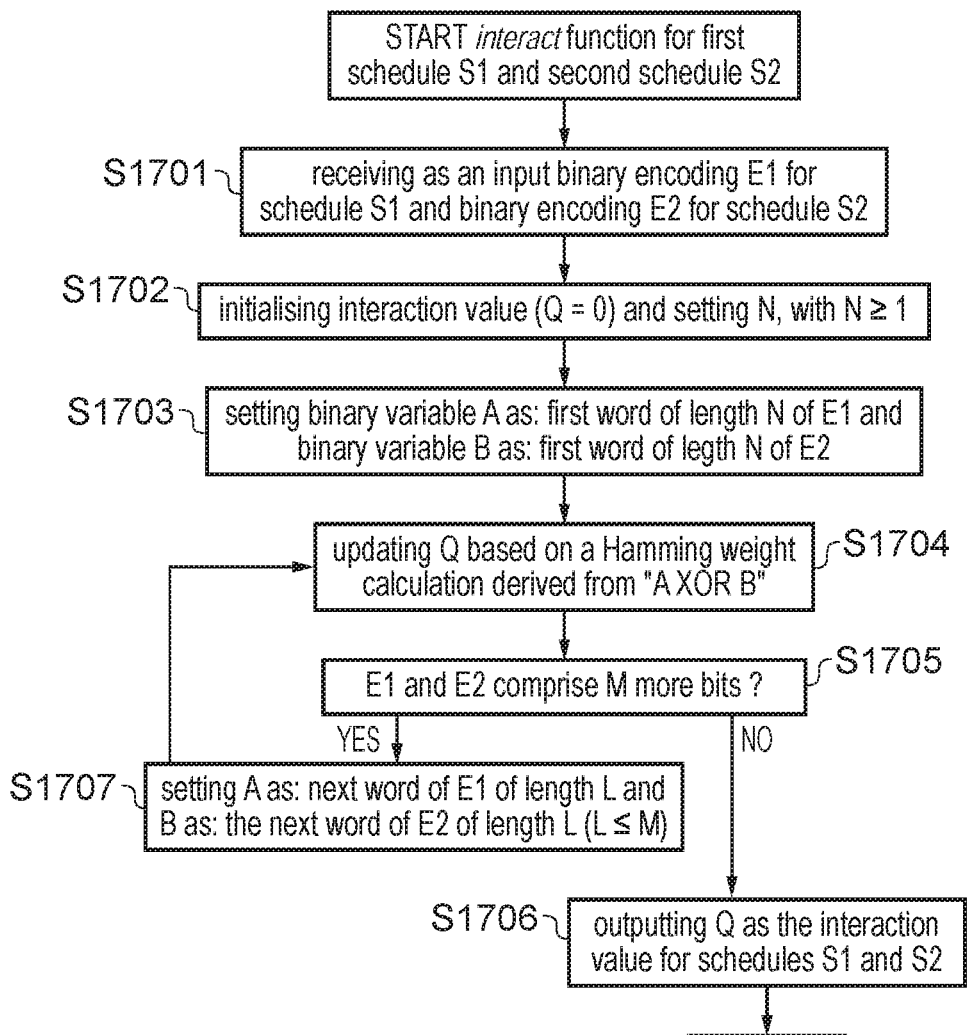
FIG. 17 is an illustration of an example interaction function for use in a method as illustrated in the example of FIG. 16 and in accordance with an example of the present disclosure.

As mentioned, FIG. 17 is an illustration of an example interaction function for use in a method as illustrated in the example of FIG. 16 and in accordance with an example of the present disclosure. The quantum term for a first schedule S1 and a second schedule S2 is calculated as described below and in accordance with the teachings discussed above. At S1701, a binary encoding E1 for schedule S1 and a binary encoding E2 for schedule S2 are received as inputs. And, as part of the initialization, the interaction value is initialized at Q=0 and N is set to a value, with N≥1. Also, binary variable A is set as the first word of length N of E1 and binary variable B as the first word of length N of E2 at S1703.

Figure 18:
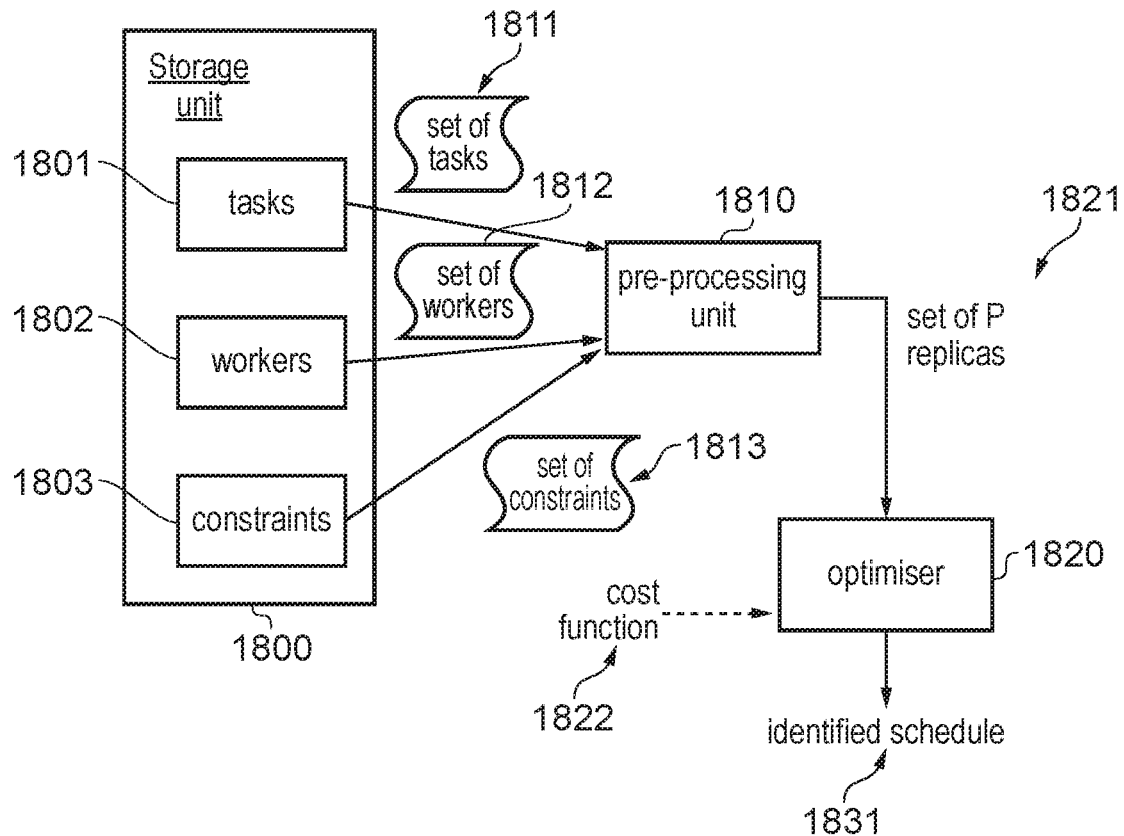
FIGS. 18-19 are illustrations of example architectures for implementing an optimizer in accordance with an example of the present disclosure.
Figure 19:
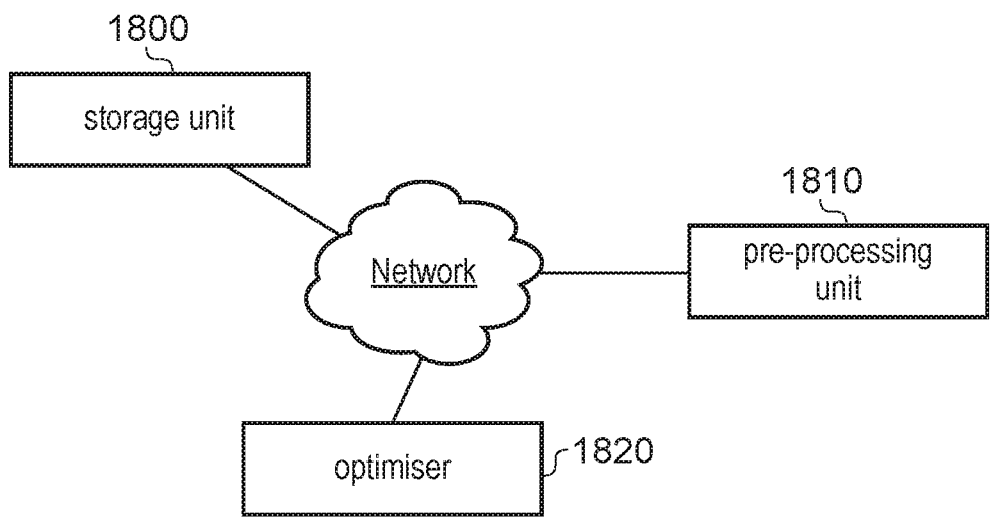

Then at S1704 the method starts a loop for updating the interaction value Q taking advantage of binary calculations as mentioned above. In particular, Q is updated based on a Hamming weight calculation derived from "A XOR B". It is then determined at S1705 whether E1 and E2 still comprise M more bits. As E1 and E2 are originally of the same length and respective portions of the same length of each of E1 and E2 are compared, they also comprise the same remaining number of bits. If E1 and E2 still comprise M more bits, then the variables A and B are set of the next word of E1 of length L and the next word of E2 of length L, respectively, with L≤M (S1706). The method can then return to S1704. If on the other hand E1 and E2 do not comprise M more bits, i.e. if they do not comprise any more bits, then the method terminates at S1706 with the outputting of Q as the interaction value for schedules S1 and S2. Accordingly, an interaction value for S1 and S2 can be calculated using binary calculations only and, as a result, the calculation of quantum terms, which is performed a large number of times when the recursive optimization is carried, is thereby accelerate due to the nature of the technology used for the calculation. FIGS. 18-19 are illustrations of example architectures for implementing an optimizer in accordance with an example of the present disclosure. In the example of FIG. 18, the system comprises a storage unit 1800 which is configured to store at least tasks data 1801, workers/workforce data 1802 and constraint data 1803. The storage unit could for example be provided in a form of a database (e.g. on a dedicated server, on a distributed architecture, etc.) or in a memory section of a computing device which can be configured to carry out other non-storage or non-database related functions (and which may be related to the QA optimizer or not). When a schedule is to be defined based on data stored in the storage unit 1800, the relevant set of tasks, workers and constraints (1811, 1812 and 1813, respectively) can be communicated to the pre-processing unit 1810. The pre-processing unit may also be provided as on a standalone device or on a distributed device which, in some examples can be configured to carry out other pre-processing related functions (and which may be related to the QA optimizer or not). The pre-processing unit 1810 can take at least tasks data, workers data and constraints data as input and is configured to output a set of P replica which is suitable for use by the optimizer 1820. For example, it can be configured to carry out the steps S801-S804 (and optionally S805) in the example method of FIG. 8 and generate P replicas comprising P encodings for processing by the QA optimizer 1820. The data can be generated to have a special structure and/or content which is specifically adapted to the QA optimization implementation of the optimizer 1820. For example, if the optimizer 1820 uses Boolean algebra to accelerate the calculations, the pre-processing unit may then output a set of P replicas comprising P Boolean encodings. Once the data set for the P replicas has been generated, it can be transmitted to the optimizer 1820 for identifying a feasible and suitable schedule. In some examples, the cost function 1822 will be already configured in the optimizer while, in other examples, the optimizer 1820 can receive the cost function 1822 to be used when optimizing the set of P replicas as an input. The optimizer can then output the identified schedule 1831 as the result of the search for an optimizer schedule.

In the example of FIG. 18, the storage unit 1800, the pre-processing unit 1810 and the optimizer 1820 have been provided as separate element connected via a private and/or public network. For example, each of these elements may be implemented as logical and/or physical standalone elements which are configured to communicate with each other via the network. It is also noteworthy that this architecture could be a virtual architecture and could also or alternatively be a distributed architecture (e.g. on a cloud environment). In other examples, two or more of the storage unit 1800, pre-processing unit 1810 and optimizer 1820 can be provided on the same physical or logical element. For example, the pre-processing unit and optimizer may be provided on the same element while the storage database can be separate and for example be provided via a dedicated storage system.

Figure 20:
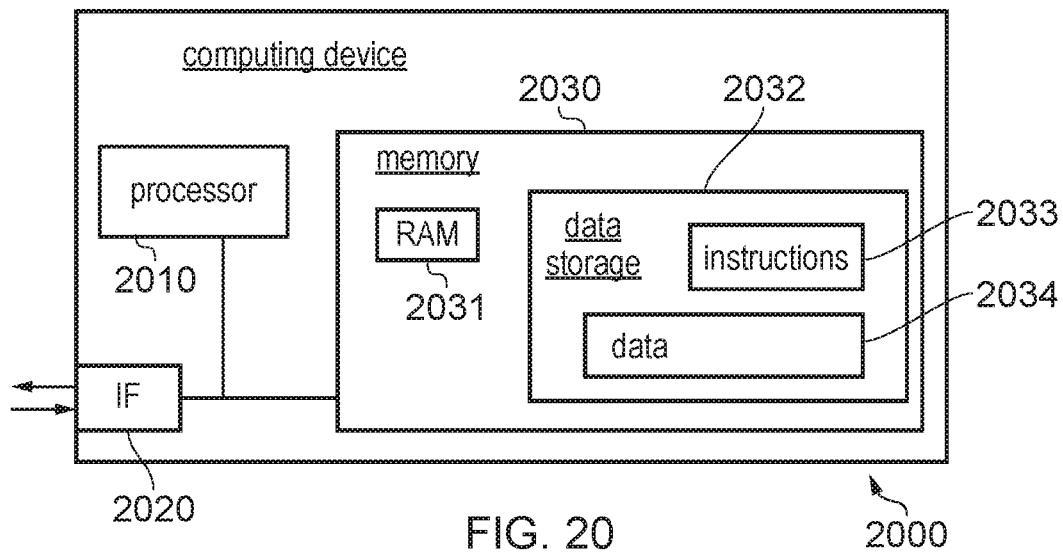
FIG. 20 is an example of a computing device in accordance with an example of the present disclosure.

FIG. 20 is an example of a computing device in accordance with an example of the present disclosure. The computing device 2000 comprises a processor 2010, e.g. one or more CPUs which may each have one or more cores. Processors, and computing hardware in general, is designed using binary logic and as such, some of the benefits discussed above can be provided by using this design feature of the computing hardware to accelerate the calculations by matching (e.g. as closely as possible) how computing is carried out at the hardware level. If appropriate (e.g. required for communicating with another computing device), the device 2000 can also include a network interface 2020 configured to exchange messages with other network interfaces. The processor 2010 and interface 2020 are also connected to each other and to a further memory element 2030. The memory 2030 can comprise different types of memory, e.g. volatile memory in the form or RAM 2031 and non-volatile memory 2032 used for data storage. For example memory 2032 could be provided in the form of a hard drive (HDD, SSD, etc.), of a memory card, of a USB pen, etc. The data storage memory 2032 can include data 2034 (e.g. variables used by a process, data sets, etc.) and can include instructions 2033 for carrying out tasks (e.g. a computer program). The instructions may be written in any suitable form, for example using one or more of a C++, Java, Python language. They may also be in a compiled or non-compiled form, as appropriate. In accordance with the teachings of the present invention, when a QA optimization process is implemented using such an architecture, the speed and/or efficiency of the search for a schedule using this architecture can be increased.

As mentioned above, the implementation may involve on or a plurality of such computing devices (e.g. if different units are provided on different physical elements and/or if a distributed architecture is used). Also, in other examples, the processes discussed herein can be implemented using a more hardware-focussed approach. It could for example be implemented on specifically hard-coded hardware designed to carry out one of more of the relevant steps of the present disclosure and/or using programmable hardware (e.g. an FPGA circuit). As the computing hardware of such arrangement will be based on the same principles as the processor or processing unit(s) of other computing devices, the benefits discussed above can also be derived using a more hardware-based implementation.

Different aspects of the present disclosure are discussed herein with reference to the following numbered clauses:

Clause 1. A method for encoding first schedule data into a data structure for use in a quantum annealing optimization process, the method comprising:

determining, by a process optimization computing device, a schedule indicator value for each of a plurality of schedule data entries based on whether each of a first set of recorded tasks has been allocated to one or more of a plurality of identifier data names in one or more of a first set of time periods in accordance with the first schedule data to generate schedule portion data;

determining, by the process optimization computing device, a hard constraint indicator value for each of a plurality of hard constraint data entries based on whether at least one of a plurality of hard constraints has been violated by the allocation of the first set of recorded tasks to one or more of the plurality of identifier data names in one or more of the first set of time periods in accordance with the first schedule data to generate hard constraint portion data; and generating, by the process optimization computing device, the data structure for use in a quantum annealing optimization process based on the determined schedule portion data and the determined hard constraint portion data, thereby encoding the first schedule data into a data structure for use in a quantum annealing optimization process.

Clause 2. The method according to Clause 1 wherein the data structure is a binary data structure, wherein the schedule indicator data entries are binary schedule indicator data entries and wherein the hard constraint data entries are binary hard constraint data entries.

Clause 3. The method according to Clause 1 or Clause 2 wherein the hard constraint data entries indicate, for each identifier data name of the plurality of identifier data names and for each hard constraint of the plurality of hard constraints, whether each of the plurality of hard constraints has been violated by the task allocations for each of the plurality of identifier data names in accordance with the first schedule data.

Clause 4. The method according to any of Clause 1 to Clause 3, wherein the method comprises:

determining, by the process optimization computing device, a task assignment indicator value for each of a plurality of task assignment data entries based on whether each of the first set of recorded tasks has been allocated to one of the plurality of identifier data names in accordance with the first schedule data to generate task assignment portion data, wherein the generating the data structure is further based on the task assignment portion data.

Clause 5. The method according to any of Clause 1 to Clause 4 wherein the method comprises:

determining, by the process optimization computing device, a conflict indicator value for each of a plurality of conflict data entries based on whether each the plurality of identifier data names has been allocated two or more of the first set of recorded tasks in one or more of the first set of time periods in accordance with the first schedule data to generate conflict portion data, wherein the generating the data structure is further based on the conflict portion data.

Clause 6. The method according to any of Clause 1 to Clause 5 wherein the method comprises:

receiving, by the process optimization computing device, a set of soft constraints defining one or more soft constraints in the allocation of tasks; and determining, by the process optimization computing device, a soft constraint indicator value for each of a plurality of soft constraint data entries based on whether each of the plurality of soft constraints has been violated by the allocation of the first set of recorded tasks to one or more of the plurality of identifier data names in one or more of the first set of time periods in accordance with the first schedule data to generate soft constraint portion data, wherein the generating the data structure is further based on soft constraint portion data.

Clause 7. The method according to any of Clause 1 to Clause 6 further comprising:

determining, by the process optimization computing device, a condition indicator value for each of a plurality of condition portion data entries based on whether each of a plurality of conditions is met for each of the plurality of identifier data names in accordance with the first schedule data, wherein the plurality of conditions are used to determine the output of a cost function for the first schedule data for use in the quantum annealing optimization process, wherein the generating the data structure is further based on the condition portion data.

Clause 8. The method according to any of Clause 1 to Clause 7 further comprising outputting, by the process optimization computing device, the data structure for the first schedule data to a quantum annealing optimizer.

Clause 9. The method according to any of Clause 1 to Clause 8 further comprising applying, by the process optimization computing device, a quantum annealing optimization process using the data structure for the first schedule data for identifying a candidate schedule for allocating the first set of recorded tasks to the plurality of identifier data names for the first set of time periods, wherein the candidate schedule meets each of the plurality of hard constraints.

Clause 10. The method according to any of Clause 1 to Clause 9 wherein the data structure is generated as one of a table or an array.

Clause 11. A non-transitory computer readable medium having stored thereon instructions for encoding first schedule data into a data structure for use in a quantum annealing optimization process comprising machine executable code which when executed by a processor, causes the processor to perform steps to and that comprise:

determine a schedule indicator value for each of a plurality of schedule data entries based on whether each of a first set of recorded tasks has been allocated to one or more of a plurality of identifier data names in one or more of a first set of time periods in accordance with the first schedule data to generate schedule portion data;

determine a hard constraint indicator value for each of a plurality of hard constraint data entries based on whether at least one of a plurality of hard constraints has been violated by the allocation of the first set of recorded tasks to one or more of the plurality of identifier data names in one or more of the first set of time periods in accordance with the first schedule data to generate hard constraint portion data; and generate the data structure for use in a quantum annealing optimization process based on the determined schedule portion data and the determined hard constraint portion data, thereby encoding the first schedule data into a data structure for use in a quantum annealing optimization process.

Clause 12. A non-transitory computer readable medium having stored thereon instructions for encoding first schedule data into a data structure for use in a quantum annealing optimization process comprising machine executable code which when executed by a processor, causes the processor to perform steps according to any of Clause 1 to Clause 10.

Clause 13. A process optimization computing device, comprising:
one or more processors;
a memory coupled to the one or more processors which are configured to be capable of executing programmed instructions stored in the memory to and that comprise:
determine a schedule indicator value for each of a plurality of schedule data entries based on whether each of a first set of recorded tasks has been allocated to one or more of a plurality of identifier data names in one or more of a first set of time periods in accordance with the first schedule data to generate schedule portion data;
determine a hard constraint indicator value for each of a plurality of hard constraint data entries based on whether at least one of a plurality of hard constraints has been violated by the allocation of the first set of recorded tasks to one or more of the plurality of identifier data names in one or more of the first set of time periods in accordance with the first schedule data to generate hard constraint portion data; and
generate the data structure for use in a quantum annealing optimization process based on the determined schedule portion data and the determined hard constraint portion data, thereby encoding the first schedule data into a data structure for use in a quantum annealing optimization process.

Clause 14. A process optimization computing device, comprising:
one or more processors;
a memory coupled to the one or more processors which are configured to be capable of executing programmed instructions stored in the memory and which are for performing the method of any of any of Clause 1 to Clause 10.

Clause 15. A method for applying a quantum annealing optimization process for identifying a candidate schedule from a universe of possible schedules, wherein each of the universe of possible schedules allocates a first set of tasks to a first workforce for a first set of time periods, the method comprising:
generating, at a process optimization computing device, based on first data representing the first set of time periods and second data representing a set of hard constraints, a set of P schedules selected from the universe of possible schedules, wherein the set of P schedules comprises an infeasible schedule in which the allocation of the first set of tasks to the first workforce violates at least one of the set of hard constraints;
generating, by the process optimization computing device, a set of P replicas from each of the set of P schedules wherein one of the set of P replicas is generated from the infeasible schedule and wherein each of the set of P replicas comprises schedule encoding data encoding one of the set of P schedules;
applying, by the process optimization computing device, a quantum annealing optimization process to recursively optimize the set of P replicas, wherein the quantum annealing optimization process uses a cost function configured to output a cost for any replica generated from the universe of possible schedules; and identifying, by the process optimization computing device, a candidate replica from one of the recursively optimized sets of P replicas based on the cost determined by the cost function for the candidate replica.

Clause 16. The method according to Clause 15, wherein the identifying the candidate replica from one of the recursively optimized set of P replicas further comprises identifying one of the recursively optimized set of P replicas for the last recursion of the recursive optimization process.

Clause 17. The method according to Clause 15 or Clause 16, wherein the identifying the candidate replica from one of the recursively optimized set of P replicas further comprises identifying one of the recursively optimized set of P replicas for a recursion of the recursive optimization process with the cost which is lowest.

Clause 18. The method according to any of Clause 15 to Clause 17 wherein the cost function is adapted to output the cost for any replica generated from an infeasible schedule of the universe of possible schedules which is in a first range [mi; Mi] and wherein the cost function is further adapted to output another cost for any replica generated from an feasible schedule of the universe of possible schedules which is in a second range [mf; Mf] wherein the first and second ranges meet at least one of {mi≥mf and Mi≥Mf} and {(Mi−mi)/2≥(Mf−mf)/2}.

Clause 19. The method according to Clause 18 wherein the first and second ranges of the cost function further meet the criterion mi≥Mf.

Clause 20. The method according to any of Clause 15 to Clause 19 wherein generating, by the process optimization computing device, the set of P replicas further comprises generating, at the process optimization computing device, for each of the set of P schedules schedule encoding data comprising a hard constraint portion indicating whether at least one of the set of hard constraints is violated by the each of the set of P schedules.

Clause 21. The method according to any of Clause 15 to Clause 20 wherein the generating, by the process optimization computing device, the set of P schedules further comprises generating, by the process optimization computing device, an additional schedule by copying and modifying one of the set of P schedules based on one or more task operations, wherein the one or more task operations are configured to change the allocation of the first set of tasks to the first workforce for the first set of time periods.

Clause 22. A non-transitory computer readable medium having stored thereon instructions for applying a quantum annealing optimization process for identifying a candidate schedule comprising machine executable code which when executed by a processor, causes the processor to perform steps to and that comprise:
generate, based on first data representing the first set of time periods and second data representing a set of hard constraints, a set of P schedules selected from the universe of possible schedules, wherein the set of P schedules comprises an infeasible schedule in which the allocation of the first set of tasks to the first workforce violates at least one of the set of hard constraints;
generate a set of P replicas from each of the set of P schedules wherein one of the set of P replicas is generated from the infeasible schedule and wherein each of the set of P replicas comprises schedule encoding data encoding one of the set of P schedules;
apply a quantum annealing optimization process to recursively optimize the set of P replicas, wherein the quantum annealing optimization process uses a cost function configured to output a cost for any replica generated from the universe of possible schedules; and identify a candidate replica from one of the recursively optimized sets of P replicas based on the cost determined by the cost function for the candidate replica.

Clause 23. A non-transitory computer readable medium having stored thereon instructions for applying a quantum annealing optimization process for identifying a candidate schedule comprising machine executable code which when executed by a processor, causes the processor to perform the method of any of Clause 15 to Clause 21.

Clause 24. A process optimization computing device, comprising:

one or more processors;

a memory coupled to the one or more processors which are configured to be capable of executing programmed instructions stored in the memory to and that comprise:

generate, based on first data representing the first set of time periods and second data representing a set of hard constraints, a set of P schedules selected from the universe of possible schedules, wherein the set of P schedules comprises an infeasible schedule in which the allocation of the first set of tasks to the first workforce violates at least one of the set of hard constraints;

generate a set of P replicas from each of the set of P schedules wherein one of the set of P replicas is generated from the infeasible schedule and wherein each of the set of P replicas comprises schedule encoding data encoding one of the set of P schedules;

apply a quantum annealing optimization process to recursively optimize the set of P replicas, wherein the quantum annealing optimization process uses a cost function configured to output a cost for any replica generated from the universe of possible schedules; and identify a candidate replica from one of the recursively optimized sets of P replicas based on the cost determined by the cost function for the candidate replica.

Clause 25. A process optimization computing device, comprising:

one or more processors;

a memory coupled to the one or more processors which are configured to be capable of executing programmed instructions stored in the memory and which are for performing the method of any of Clause 15 to Clause 21.

Clause 26. A method for applying a quantum annealing optimization process for identifying a candidate schedule, the method comprising:

generating, by a process optimization computing device, a set of P schedules;

applying, by the process optimization computing device, a quantum annealing optimization process by recursively updating the set of P schedules; and identifying, by the process optimization computing device, a candidate schedule from the recursively updated set of P schedules;

wherein for each of the recursively updated set of P schedules, an alternative schedule is generated, by the process optimization computing device, and is compared, by the process optimization computing device, to the each of the recursively updated set of P schedules based on a comparison of a quantum term for the each of the recursively updated set of P schedules and of a corresponding quantum term for the alternative schedule;

wherein a quantum term is calculated using an interaction function configured to output an interaction value Q for two schedules S1 and S2 of the recursively updated set of P schedules; and wherein the using, by the process optimization computing device, the interaction function to output the interaction value Q for the schedules S1 and S2 further comprises:

receiving as an input a binary encoding E1 for the first schedule S1 and a binary encoding E2 for the second schedule S2, wherein the binary encodings E1 and E2 include a same number of bits;

initializing the interaction value Q to zero;

setting a value of N to a value of one or more;

setting a binary variable A as the first N bits of the binary encoding E1 and setting a binary variable B as the first N bits of the binary encoding E2;

updating the interaction value Q based on a Hamming weight calculation for a binary variable derived from an XOR operation applied to the binary variables A and B;

as long as the binary encoding E1 comprises one or more M bits after the binary value A and the binary encoding E2 comprises one or more M bits after the binary variable B, re-setting the binary variable A as being the first L bits of the one or more M bits of the binary encoding E1, with L≤M, re-setting the binary variable B as being the first L bits of the one or more M bits of the binary encoding E2 and repeating the updating; and outputting the interaction value Q for the schedules S1 and S2.

Clause 27. The method according to Clause 26 wherein the updating the interaction value Q further comprises:

calculating, by the process optimization computing device, an outcome C of the "XOR" operation applied to the binary variables A and B;

revising, by the process optimization computing device, the interaction value Q to which a Hamming weight of C is subtracted;

Clause 28. The method according to Clause 27 wherein the updating the interaction value Q further comprises:

calculating, by the process optimization computing device, an outcome D of a "NOT" operation applied to the Hamming weight of C;

revising, by the process optimization computing device, the interaction value Q to which the outcome D is added;

Clause 29. The method according to any of Clause 26 to Clause 28 wherein:

N is equal to X; and as long as the binary encoding E1 comprises at least X bits after the binary value A and the binary encoding E2 comprises at least X bits after the binary value B, the optimizer sets the certain length L as X;

when the binary encoding E1 comprises one or more M bits after the binary value A and does not comprise at least X bits after the binary value A and when the binary encoding E2 comprises at least one or more M bits after the binary value B and does not comprise X bits after the binary value B, the certain length L is set as the one or more M bits.

Clause 30. The method according to Clause 29 wherein X is equal to 32 or 64.

Clause 31. A non-transitory computer readable medium having stored thereon instructions for applying a quantum annealing optimization process for identifying a candidate schedule comprising machine executable code which when executed by a processor, causes the processor to perform steps to and that comprise:

generate a set of P schedules;

apply a quantum annealing optimization process by recursively updating the set of P schedules; and identify a candidate schedule from the recursively updated set of P schedules;

wherein for each of the recursively updated set of P schedules, an alternative schedule is generated and is compared to the each of the recursively updated set of P schedules based on a comparison of a quantum term for the each of the recursively updated set of P schedules and of a corresponding quantum term for the alternative schedule;

wherein a quantum term is calculated using an interaction function configured to output an interaction value Q for two schedules S1 and S2 of the recursively updated set of P schedules; and wherein the using the interaction function to output the interaction value Q for the schedules S1 and S2 further comprises:

receiving as an input a binary encoding E1 for the first schedule S1 and a binary encoding E2 for the second schedule S2, wherein the binary encodings E1 and E2 include a same number of bits;

initializing the interaction value Q to zero;

setting a value of N to a value of one or more;

setting a binary variable A as the first N bits of the binary encoding E1 and setting a binary variable B as the first N bits of the binary encoding E2;

updating the interaction value Q based on a Hamming weight calculation for a binary variable derived from an XOR operation applied to the binary variables A and B;

as long as the binary encoding E1 comprises one or more M bits after the binary value A and the binary encoding E2 comprises one or more M bits after the binary variable B, re-setting the binary variable A as being the first L bits of the one or more M bits of the binary encoding E1, with L≤M, re-setting the binary variable B as being the first L bits of the one or more M bits of the binary encoding E2 and repeating the updating; and outputting the interaction value Q for the schedules S1 and S2.

Clause 32. A non-transitory computer readable medium having stored thereon instructions for applying a quantum annealing optimization process for identifying a candidate schedule comprising machine executable code which when executed by a processor, causes the processor to perform the method of any of Clause 26 to Clause 30.

Clause 33. A process optimization computing device, comprising:

one or more processors;

a memory coupled to the one or more processors which are configured to be capable of executing programmed instructions stored in the memory to and that comprise:

generate a set of P schedules;

apply a quantum annealing optimization process by recursively updating the set of P schedules; and identify a candidate schedule from the recursively updated set of P schedules;

wherein for each of the recursively updated set of P schedules, an alternative schedule is generated and is compared to the each of the recursively updated set of P schedules based on a comparison of a quantum term for the each of the recursively updated set of P schedules and of a corresponding quantum term for the alternative schedule;

wherein a quantum term is calculated using an interaction function configured to output an interaction value Q for two schedules S1 and S2 of the recursively updated set of P schedules; and wherein the using the interaction function to output the interaction value Q for the schedules S1 and S2 further comprises:

receiving as an input a binary encoding E1 for the first schedule S1 and a binary encoding E2 for the second schedule S2, wherein the binary encodings E1 and E2 include a same number of bits;

initializing the interaction value Q to zero;

setting a value of N to a value of one or more;

setting a binary variable A as the first N bits of the binary encoding E1 and setting a binary variable B as the first N bits of the binary encoding E2;

updating the interaction value Q based on a Hamming weight calculation for a binary variable derived from an XOR operation applied to the binary variables A and B;

as long as the binary encoding E1 comprises one or more M bits after the binary value A and the binary encoding E2 comprises one or more M bits after the binary variable B, re-setting the binary variable A as being the first L bits of the one or more M bits of the binary encoding E1, with L≤M, re-setting the binary variable B as being the first L bits of the one or more M bits of the binary encoding E2 and repeating the updating; and outputting the interaction value Q for the schedules S1 and S2.

Clause 34. A process optimization computing device, comprising:

one or more processors;

a memory coupled to the one or more processors which are configured to be capable of executing programmed instructions stored in the memory and that are for performing the method of any of Clause 26 to Clause 30.

What is claimed is:

1. A method for encoding first schedule data into a data structure for use in a quantum annealing optimization process, the method comprising:

determining, by a process optimization computing device, a schedule indicator value for each of a plurality of schedule data entries based on whether each of a first set of recorded tasks has been allocated to one or more of a plurality of identifier data names in one or more of a first set of time periods in accordance with the first schedule data to generate schedule portion data;

determining, by the process optimization computing device, a hard constraint indicator value for each of a plurality of hard constraint data entries based on whether at least one of a plurality of hard constraints has been violated by the allocation of the first set of recorded tasks to one or more of the plurality of identifier data names in one or more of the first set of time periods in accordance with the first schedule data to generate hard constraint portion data; and generating, by the process optimization computing device, the data structure for use in a quantum annealing optimization process based on the determined schedule portion data and the determined hard constraint portion data, thereby encoding the first schedule data into a data structure for use in a quantum annealing optimization process.

2. The method according to claim 1 wherein the data structure is a binary data structure, wherein the schedule indicator data entries are binary schedule indicator data entries and wherein the hard constraint data entries are binary hard constraint data entries.

3. The method according to claim 1 wherein the hard constraint data entries indicate, for each identifier data name of the plurality of identifier data names and for each hard constraint of the plurality of hard constraints, whether each of the plurality of hard constraints has been violated by the task allocations for each of the plurality of identifier data names in accordance with the first schedule data.

4. The method according to claim 1 further comprising:
determining, by the process optimization computing device, a task assignment indicator value for each of a plurality of task assignment data entries based on whether each of the first set of recorded tasks has been allocated to one of the plurality of identifier data names in accordance with the first schedule data to generate task assignment portion data,
wherein the generating the data structure is further based on the task assignment portion data.

5. The method according to claim 1 further comprising:
determining, by the process optimization computing device, a conflict indicator value for each of a plurality of conflict data entries based on whether each the plurality of identifier data names has been allocated two or more of the first set of recorded tasks in one or more of the first set of time periods in accordance with the first schedule data to generate conflict portion data,
wherein the generating the data structure is further based on the conflict portion data.

6. The method according to claim 1 further comprising:
receiving, by the process optimization computing device, a set of soft constraints defining one or more soft constraints in the allocation of tasks; and
determining, by the process optimization computing device, a soft constraint indicator value for each of a plurality of soft constraint data entries based on whether each of the plurality of soft constraints has been violated by the allocation of the first set of recorded tasks to one or more of the plurality of identifier data names in one or more of the first set of time periods in accordance with the first schedule data to generate soft constraint portion data,
wherein the generating the data structure is further based on soft constraint portion data.

7. The method according to claim 1 further comprising:
determining, by the process optimization computing device, a condition indicator value for each of a plurality of condition portion data entries based on whether each of a plurality of conditions is met for each of the plurality of identifier data names in accordance with the first schedule data,
wherein the plurality of conditions are used to determine the output of a cost function for the first schedule data for use in the quantum annealing optimization process,
wherein the generating the data structure is further based on the condition portion data.

8. The method according to claim 1 further comprising outputting, by the process optimization computing device, the data structure for the first schedule data to a quantum annealing optimizer.

9. The method according to claim 1 further comprising applying, by the process optimization computing device, a quantum annealing optimization process using the data structure for the first schedule data for identifying a candidate schedule for allocating the first set of recorded tasks to the plurality of identifier data names for the first set of time periods, wherein the candidate schedule meets each of the plurality of hard constraints.

10. The method according to claim 1 wherein the data structure is generated as one of a table or an array.

11. A non-transitory computer readable medium having stored thereon instructions for encoding first schedule data into a data structure for use in a quantum annealing optimization process comprising machine executable code which when executed by a processor, causes the processor to perform steps to and that comprise:

determine a schedule indicator value for each of a plurality of schedule data entries based on whether each of a first set of recorded tasks has been allocated to one or more of a plurality of identifier data names in one or more of a first set of time periods in accordance with the first schedule data to generate schedule portion data;
determine a hard constraint indicator value for each of a plurality of hard constraint data entries based on whether at least one of a plurality of hard constraints has been violated by the allocation of the first set of recorded tasks to one or more of the plurality of identifier data names in one or more of the first set of time periods in accordance with the first schedule data to generate hard constraint portion data; and
generate the data structure for use in a quantum annealing optimization process based on the determined schedule portion data and the determined hard constraint portion data, thereby encoding the first schedule data into a data structure for use in a quantum annealing optimization process.

12. The medium according to claim 11 wherein the data structure is a binary data structure, wherein the schedule indicator data entries are binary schedule indicator data entries and wherein the hard constraint data entries are binary hard constraint data entries.

13. The medium according to claim 11 wherein the hard constraint data entries indicate, for each identifier data name of the plurality of identifier data names and for each hard constraint of the plurality of hard constraints, whether each of the plurality of hard constraints has been violated by the task allocations for each of the plurality of identifier data names in accordance with the first schedule data.

14. The medium according to claim 11, further comprising:
determine a task assignment indicator value for each of a plurality of task assignment data entries based on whether each of the first set of recorded tasks has been allocated to one of the plurality of identifier data names in accordance with the first schedule data to generate task assignment portion data,
wherein the generate the data structure is further based on the task assignment portion data.

15. The medium according to claim 11 further comprising:
determine a conflict indicator value for each of a plurality of conflict data entries based on whether each the plurality of identifier data names has been allocated two or more of the first set of recorded tasks in one or more of the first set of time periods in accordance with the first schedule data to generate conflict portion data,
wherein the generate the data structure is further based on the conflict portion data.

16. The medium according to claim 11 further comprising:
receive a set of soft constraints defining one or more soft constraints in the allocation of tasks; and
determine a soft constraint indicator value for each of a plurality of soft constraint data entries based on whether each of the plurality of soft constraints has been violated by the allocation of the first set of recorded tasks to one or more of the plurality of identifier data names in one or more of the first set of time periods in accordance with the first schedule data to generate soft constraint portion data,
wherein the generate the data structure is further based on soft constraint portion data.

17. The medium according to claim 11 further comprising:
determine a condition indicator value for each of a plurality of condition portion data entries based on whether each of a plurality of conditions is met for each of the plurality of identifier data names in accordance with the first schedule data,
wherein the plurality of conditions are used to determine the output of a cost function for the first schedule data for use in the quantum annealing optimization process,
wherein the generate the data structure is further based on the condition portion data.

18. The medium according to claim 11 further comprising output the data structure for the first schedule data to a quantum annealing optimizer.

19. The medium according to claim 11 further comprising apply a quantum annealing optimization process using the data structure for the first schedule data for identifying a candidate schedule for allocating the first set of recorded tasks to the plurality of identifier data names for the first set of time periods, wherein the candidate schedule meets each of the plurality of hard constraints.

20. The medium according to claim 11 wherein the data structure is generated as one of a table or an array.

21. A process optimization computing device, comprising:
one or more processors;
a memory coupled to the one or more processors which are configured to be capable of executing programmed instructions stored in the memory to and that comprise:
determine a schedule indicator value for each of a plurality of schedule data entries based on whether each of a first set of recorded tasks has been allocated to one or more of a plurality of identifier data names in one or more of a first set of time periods in accordance with the first schedule data to generate schedule portion data;
determine a hard constraint indicator value for each of a plurality of hard constraint data entries based on whether at least one of a plurality of hard constraints has been violated by the allocation of the first set of recorded tasks to one or more of the plurality of identifier data names in one or more of the first set of time periods in accordance with the first schedule data to generate hard constraint portion data; and
generate the data structure for use in a quantum annealing optimization process based on the determined schedule portion data and the determined hard constraint portion data, thereby encoding the first schedule data into a data structure for use in a quantum annealing optimization process.

22. The device according to claim 21 wherein the data structure is a binary data structure, wherein the schedule indicator data entries are binary schedule indicator data entries and wherein the hard constraint data entries are binary hard constraint data entries.

23. The device according to claim 21 wherein the hard constraint data entries indicate, for each identifier data name of the plurality of identifier data names and for each hard constraint of the plurality of hard constraints, whether each of the plurality of hard constraints has been violated by the task allocations for each of the plurality of identifier data names in accordance with the first schedule data.

24. The device according to claim 21, wherein the one or more processors are configured to be capable of executing one or more additional programmed instructions stored in the memory to and that comprise:
determine a task assignment indicator value for each of a plurality of task assignment data entries based on whether each of the first set of recorded tasks has been allocated to one of the plurality of identifier data names in accordance with the first schedule data to generate task assignment portion data,
wherein the generate the data structure is further based on the task assignment portion data.

25. The device according to claim 21 wherein the one or more processors are configured to be capable of executing one or more additional programmed instructions stored in the memory to and that comprise:
determine a conflict indicator value for each of a plurality of conflict data entries based on whether each the plurality of identifier data names has been allocated two or more of the first set of recorded tasks in one or more of the first set of time periods in accordance with the first schedule data to generate conflict portion data,
wherein the generate the data structure is further based on the conflict portion data.

26. The device according to claim 21 wherein the one or more processors are configured to be capable of executing one or more additional programmed instructions stored in the memory to and that comprise:
receive a set of soft constraints defining one or more soft constraints in the allocation of tasks; and
determine a soft constraint indicator value for each of a plurality of soft constraint data entries based on whether each of the plurality of soft constraints has been violated by the allocation of the first set of recorded tasks to one or more of the plurality of identifier data names in one or more of the first set of time periods in accordance with the first schedule data to generate soft constraint portion data,
wherein the generate the data structure is further based on soft constraint portion data.

27. The device according to claim 21 wherein the one or more processors are configured to be capable of executing one or more additional programmed instructions stored in the memory to and that comprise:
determine a condition indicator value for each of a plurality of condition portion data entries based on whether each of a plurality of conditions is met for each of the plurality of identifier data names in accordance with the first schedule data,
wherein the plurality of conditions are used to determine the output of a cost function for the first schedule data for use in the quantum annealing optimization process,
wherein the generate the data structure is further based on the condition portion data.

28. The device according to claim 21 wherein the one or more processors are configured to be capable of executing one or more additional programmed instructions stored in the memory to and that comprise output the data structure for the first schedule data to a quantum annealing optimizer.

29. The device according to claim 21 wherein the one or more processors are configured to be capable of executing one or more additional programmed instructions stored in the memory to and that comprise apply a quantum annealing optimization process using the data structure for the first schedule data for identifying a candidate schedule for allocating the first set of recorded tasks to the plurality of identifier data names for the first set of time periods, wherein the candidate schedule meets each of the plurality of hard constraints.

30. The device according to claim 21 wherein the data structure is generated as one of a table or an array.

* * * * *